United States Patent
Han

(10) Patent No.: US 10,525,827 B2
(45) Date of Patent: Jan. 7, 2020

(54) CONTROL METHOD OF POWER TRAIN SYSTEM

(71) Applicant: Seung Woo Han, Incheon (KR)

(72) Inventor: Seung Woo Han, Incheon (KR)

(73) Assignee: INFINITRANS ALPHA CO., LTD., Incheon (KR)

( * ) Notice: Subject to any disclaimer, the term of this patent is extended or adjusted under 35 U.S.C. 154(b) by 120 days.

(21) Appl. No.: 15/794,020

(22) Filed: Oct. 26, 2017

(65) Prior Publication Data
US 2019/0118651 A1    Apr. 25, 2019

(30) Foreign Application Priority Data

Oct. 20, 2017 (KR) .......................... 10-2017-0136873

(51) Int. Cl.

| | |
|---|---|
| *B60K 17/16* | (2006.01) |
| *B60K 17/02* | (2006.01) |
| *B60K 17/08* | (2006.01) |
| *B60K 17/35* | (2006.01) |
| *B60K 23/04* | (2006.01) |
| *B60W 10/02* | (2006.01) |

(Continued)

(52) U.S. Cl.
CPC .............. *B60K 17/16* (2013.01); *B60K 17/02* (2013.01); *B60K 17/08* (2013.01); *B60K 17/35* (2013.01); *B60K 23/04* (2013.01); *B60W 10/02* (2013.01); *B60W 20/10* (2013.01); *B60W 30/188* (2013.01); *B60W 2710/024* (2013.01); *B60W 2710/028* (2013.01); *B60W 2710/1038* (2013.01)

(58) Field of Classification Search
CPC .... F16H 3/001; F16H 2003/0803; F16H 1/22; B60K 17/16; B60K 23/04
See application file for complete search history.

(56) References Cited

U.S. PATENT DOCUMENTS 3,897,699 A * 8/1975 Hoyer ..................... F16H 3/093
74/15.4
5,620,387 A    4/1997 Janiszewski
(Continued)

FOREIGN PATENT DOCUMENTS

| CN | 104773063 A | 7/2015 |
|---|---|---|
| DE | 19917724 A1 | 11/2000 |

(Continued)

*Primary Examiner* — Stacey A Fluhart

(57) ABSTRACT

A control method of a power train system is provided. The control method of a power train system may include: a power output step and a power change step. The power change step may include: a shaft driving process of rotating a reverse input driving shaft separated from an axle shaft connected to the left and right wheels and installed in parallel to the axle shaft and a forward input driving shaft installed in parallel to the reverse input driving shaft; a clutch fixing process of fixing any one of reverse or forward clutch parts to the reverse or forward input driving shaft by supplying operation oil to the corresponding clutch part, wherein the reverse and forward clutch parts are installed on the reverse and forward input driving shafts, respectively, and each of the reverse and forward clutch parts includes a pair of clutch parts; and a changed power output process of transferring the changed power to the axle shaft through the reverse or forward clutch part fixed through the clutch fixing process.

20 Claims, 18 Drawing Sheets

(51) Int. Cl.
*B60W 20/10* (2016.01)
*B60W 30/188* (2012.01)

(56) References Cited

U.S. PATENT DOCUMENTS

| | | | |
|---|---|---|---|
| 5,868,641 A * | 2/1999 | Bender | B60K 17/16 |
| | | | 475/203 |
| 2002/0028721 A1* | 3/2002 | Inoue | F16H 57/04 |
| | | | 475/198 |
| 2005/0266951 A1 | 12/2005 | Han | |
| 2008/0028759 A1 | 2/2008 | Carson et al. | |
| 2008/0296081 A1* | 12/2008 | Yamamura | B60K 23/04 |
| | | | 180/378 |
| 2010/0048339 A1 | 2/2010 | Han | |
| 2011/0172049 A1 | 7/2011 | Valesh | |
| 2011/0214533 A1* | 9/2011 | Koyama | B60W 10/02 |
| | | | 74/665 A |
| 2015/0240916 A1 | 8/2015 | Valesh | |
| 2017/0204940 A1 | 7/2017 | Tseng et al. | |
| 2018/0266519 A1* | 9/2018 | Potignano | F16H 3/08 |

FOREIGN PATENT DOCUMENTS

| | | |
|---|---|---|
| EP | 2556978 A1 | 2/2013 |
| EP | 1945475 B1 | 4/2014 |
| JP | S39-5562 B | 4/1962 |
| JP | H01-78754 A | 5/1989 |
| JP | 11-334395 A | 12/1999 |
| JP | 2000-170851 A | 6/2000 |
| JP | 2005-54957 A | 3/2005 |
| JP | 2005-200000 A | 7/2005 |
| KR | 10-0168386 B1 | 1/1999 |
| KR | 10-0425277 B1 | 3/2004 |
| KR | 10-0442475 B1 | 7/2004 |
| KR | 10-0685322 B1 | 2/2007 |
| WO | 2006104294 A1 | 10/2006 |
| WO | 2007049882 A1 | 5/2007 |
| WO | 2013089457 A1 | 6/2013 |

* cited by examiner

CONTROL METHOD OF POWER TRAIN SYSTEM

CROSS-REFERENCE TO RELATED APPLICATION(S)

This application claims benefit of priority to Korean Patent Application No. 10-2017-0136873 filed on Oct. 20, 2017 in the Korean Intellectual Property Office, the disclosure of which is incorporated herein by reference in its entirety.

BACKGROUND

1. Field

The present disclosure relates to a control method of a power train system.

2. Description of Related Art

As is generally known, a power train system of a vehicle includes a power generator for generating a driving power, a power converter for converting the torque and speed of the driving power generated by the power generator, and a power transfer unit for transferring the driving power, of which the output torque and speed are converted by the power converter, to a plurality of wheels.

The power generator may be installed in an internal combustion engine based on the combustion of fossil fuel, a motor engine based on the supply of electric force, a hybrid engine having an internal combustion engine and motor engine combined therein, and other types of motors.

The power converter generally includes a torque converter for converts the torque of a driving power outputted from the power generator and a transmission for changing a rotation speed.

The power transfer unit includes a differential gear and an axle shaft. The differential gear receives the driving power of which the output torque and speed are converted by the power converter, and the axle shaft transfers the driving power distributed by the differential gear to left and right wheels.

In general, a clutch system is further installed between the power generator and the power converter. Theoretically, the clutch system may be installed between the power generator and the power converter as described above, installed between the power converter and the power transfer unit, or installed between the power transfer unit and the left and right wheels which finally receive the driving power.

The clutch system may be disposed between parts which transfer and receive a driving power, in order to temporally block a transfer of the driving power. Therefore, the clutch system allows a vehicle to smoothly repeat stopping and running, without stopping the power generator.

In the case of a commercial vehicle, the clutch system may be installed to interrupt power between the power generator and the power converter, in order to minimize the consumption of energy generated by the power generator.

However, the position of the clutch system does not need to be limited. In many cases, the position of the clutch system may be changed depending on the types and features of vehicles to which the clutch system is applied. That is, a commercial vehicle and a heavy equipment vehicle used for a special operation are different from each other in terms of a required torque and required driving speed. Therefore, since each of the vehicles has significantly different driving efficiency and operation efficiency depending on the characteristics thereof, the structures of the power generator, the power converter and the power transfer unit need to be changed and designed according to the characteristics of each vehicle.

Depending on the characteristics of each vehicle, the design change of the power generator, the power converter and the power transfer unit is conducted in a different manner. Therefore, the power generator, the power converter and the power transfer unit are inevitably designed by a plurality of manufacturers, which makes it difficult to design an integration structure.

Furthermore, since the driving power outputted from the power converter must be distributed and transferred to the left and right wheels, the driving power is transferred through a bevel gear connected to the differential gear connecting left and right axle shafts.

More specifically, the bevel gear has a rotating shaft (hereafter, referred to as 'bevel gear rotating shaft') which is horizontally installed in the longitudinal direction of a vehicle body, and the left and right axle shafts are horizontally installed in the side-to-side direction.

At this time, since the bevel gear must be engaged so as not to significantly deviate from the central axis of a beveling gear installed on the differential gear, the design of the bevel gear rotating shaft for the axle shafts is considerably limited. In other words, since the bevel gear rotating shaft and the beveling gear are engaged to switch the direction of a driving power to a substantially orthogonal direction, a general spur gear engagement is unstable, and a spiral gear engagement is established. Therefore, the bevel gear rotating shaft and the rotating shaft of the beveling gear must be designed to be positioned at substantially the same height. When the bevel gear rotating shaft and the rotating shaft of the beveling gear are designed to have a predetermined height difference therebetween, the slopes of the tooth profiles of the bevel gear and the beveling gear must be increased. However, there is a limitation in increasing the slopes of the tooth profiles of the bevel gear and the beveling gear.

As long as the bevel gear is installed at the leading end of a propeller shaft including a universal joint coupling, the design of the vertical height difference between the bevel gear and the axle shaft has a tolerance to some extent. However, since the original function of the propeller shaft is to absorb a vertical height difference caused by a suspension system, it is not easy to secure a degree of freedom in design beyond the function.

Recently, the above-described power train system of a general vehicle is just applied to a heavy equipment vehicle such as a forklift truck. Korean Patent Registration No. 10-0425277, which had been filed by the present applicant and registered in the Korean Intellectual Property Office, is a representative example.

The system according to the patent document has been devised to not only minimize noise and vibration of an engine, which may occur when a power train system of a general vehicle is applied to a heavy equipment vehicle such as a forklift truck, but also minimize the turning radius of a heavy equipment vehicle. According to the patent document, a transmission and clutch system may be integrated in an axle hub of an axle shaft in order to improve braking performance, and the design of engine mounting and axle mounting may be facilitated through a compact structure.

However, when the transmission and the clutch system are integrated in the left and right axle shafts having different gears installed therein, the load may be concentrated. In this case, the structure must have a strong housing to protect the respective components, and the engagement between gears must be performed with precision. Thus, the manufacturing cost is significantly increased.

Furthermore, since the bevel gear is directly engaged with the beveling gear installed on the differential gear, the whole length of the power train system including the propeller shaft is increased to limit the degree of freedom in structure design.

SUMMARY

An object of the present disclosure is to provide a control method of a power train system which is capable of improving the entire degree of freedom in design for a power transfer structure.

An object of the present disclosure is to provide a control method of a power train system which is capable of distributing a concentrated load of an axle shaft, thereby reducing the size of a product.

An object of the present disclosure is to provide a control method of a power train system which is capable of performing a multi-stage speed change including two or four speeds, even when being applied to a heavy equipment vehicle.

An object of the present disclosure is to provide a control method of a power train system which is capable of partially removing a torque converter for increasing an output torque.

An object of the present disclosure is to provide a control method of a power train system which can be substituted with an electrically driven motor engine.

An object of the present disclosure is to provide a control method of a power train system which is capable of reducing a manufacturing cost.

According to an embodiment of the present disclosure, a control method of a power train system may include: a power output step in which a first transmission unit receives a power generated from a power generator, and outputs the received power through a bevel gear part forming a bevel gear rotating shaft in a longitudinal direction of a vehicle body; and a power change step in which a second transmission unit changes the power inputted through the power output step to a specific speed, and transfers the changed power to wheel driving units installed at left and right wheels. The power change step may include: a shaft driving process of rotating a reverse input driving shaft separated from an axle shaft connected to the left and right wheels and installed in parallel to the axle shaft and a forward input driving shaft installed in parallel to the reverse input driving shaft; a clutch fixing process of fixing any one of reverse and forward clutch parts to the reverse or forward input driving shaft by supplying operation oil to the corresponding clutch part, wherein the reverse and forward clutch parts are installed on the reverse and forward input driving shafts, respectively, and each of the reverse and forward clutch parts includes a pair of clutch parts; and a changed power output process of transferring the changed power to the axle shaft through the reverse or forward clutch part fixed through the clutch fixing process.

The shaft driving process may include a process of rotating the reverse and forward input driving shafts at the same time, using an idler part which is installed coaxially with the axle shaft or separated from the axle shaft, installed in parallel to the reverse and forward input driving shafts, and engaged with the reverse and forward input driving shafts at the same time.

The clutch fixing process may include a first reverse speed process of fixing a first reverse speed clutch part to the reverse input driving shaft by supplying operation oil to the first reverse speed clutch part having a first reverse speed drive gear in the reverse clutch part.

Moreover, the clutch fixing process may include a second reverse speed process of fixing a second reverse speed clutch part to the reverse input driving shaft by supplying operation oil to the second reverse speed clutch part having a second reverse speed drive gear in the reverse clutch part.

Furthermore, the clutch fixing process may include a first forward speed process of fixing a first forward speed clutch part to the forward input driving shaft by supplying operation oil to the first forward speed clutch part having a first forward speed gear in the forward clutch part.

Moreover, the clutch fixing process may include a second forward speed process of fixing a second forward speed clutch part to the forward input driving shaft by supplying operation oil to the second forward speed clutch part having a second forward speed gear in the forward clutch part.

The changed power output process may include a process of engaging any one of the reverse and forward clutch parts with any one of first and second transfer gears of a differential gear part installed between a left axle shaft connected to the left wheel of the wheels and a right axle shaft connected to the right wheel of the wheels.

The changed power output process may include a first reverse speed output process of fixing a first reverse speed clutch part of the reverse clutch part to the reverse input driving shaft such that a first reverse speed drive gear installed in the first reverse speed clutch part is engaged with any one of first and second transfer gears of the differential gear part.

Moreover, the changed power output process may include a second reverse speed output process of fixing a second reverse speed clutch part of the reverse clutch part to the reverse input driving shaft such that a second reverse speed drive gear installed in the second reverse speed clutch part is engaged with any one of first and second transfer gears of the differential gear part.

Furthermore, the changed power output process may include a first forward speed output process of fixing a first forward speed clutch part of the forward clutch part to the forward input driving shaft such that a first forward speed drive gear installed in the first forward speed clutch part is engaged with any one of first and second transfer gears of the differential gear part.

Moreover, the changed power output process may include a second forward speed output process of fixing a second forward speed clutch part of the forward clutch part to the forward input driving shaft such that a second forward speed drive gear installed in the second forward speed clutch part is engaged with any one of first and second transfer gears of the differential gear part.

DETAILED DESCRIPTION

Hereafter, a power train system, a vehicle including the same and a control method thereof according to embodiments of the present disclosure will be described in detail with reference to the accompanying drawings.

Figure 1:
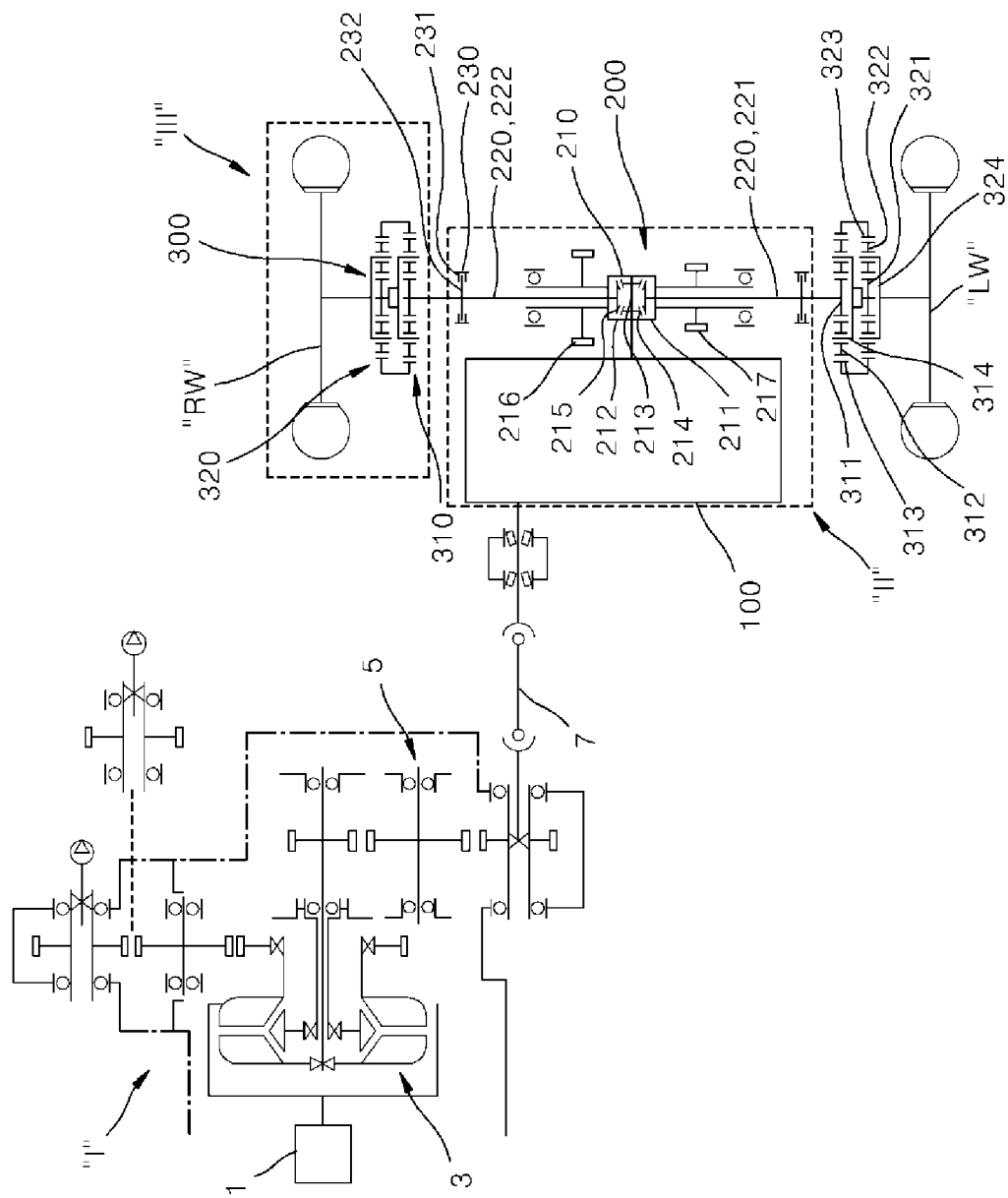
FIG. 1 is a schematic diagram illustrating a power train system according to an embodiment of the present disclosure.

FIG. 1 is a schematic diagram illustrating a power train system according to an embodiment of the present disclosure.

The power train system according to the embodiment of the present disclosure is applied to a vehicle. The vehicle includes all kinds of means of transportation which can be driven by a driving power generated through a driving source (power generator 1) such as an engine. For example, the vehicle may include a truck, van, sports-utility vehicle and heavy equipment vehicle as well as a general car.

FIG. 1 illustrates a rear-wheel-drive power train system, but the power train system according to the present embodiment may also include a front-wheel-drive power train system without departing the scope of the invention.

The driving source (power generator 1) which provides a driving power to be transferred through the power train system may include a conventional internal combustion engine, a motor engine M, a hybrid engine and other types of motors.

The power train system and the vehicle including the same according to the present embodiment relate to a power train system which receives power generated by a power generator 1, converts the torque of the received power through a torque converter 3, and transfers the torque-converted power to left and right wheels LW and RW through a bevel gear (with no reference numeral) installed at the leading end of a propeller shaft 7.

In general, a power generator is defined as a driving source to generate power, and a power converter refers to a part for converting the rotation speed or output torque of the generated power. In the power train system according to the present embodiment, however, the entire structure between the power generator 1 and the propeller shaft 7 is defined as 'first transmission unit I', and the entire structure between the propeller shaft 7 and a wheel driving unit III described later is defined as 'second transmission unit II', for convenience of description.

Although not illustrated, the first transmission unit I may be installed in a transmission housing and mounted on a vehicle body, and the second transmission unit II and the wheel driving unit III may be installed in an axle housing distinguished from the transmission housing, and integrated with the vehicle body.

As illustrated in FIG. 1, the power train system and the vehicle including the same according to the present embodiment may include an axle input unit 100 and an axle output unit 200. The axle input unit 100 may be connected to a bevel gear part forming a bevel gear rotating shaft installed in the longitudinal direction of the vehicle body so as to receive a driving power of the first transmission unit I, and selectively switch the received driving power to any one of a forward driving power and reverse driving power or change the received driving power through multiple speeds, and the axle output unit 200 may receive the driving power outputted from the axle input unit 100, and output the received driving power to the wheel driving units III connected to the left and right wheels LW and RW. The detailed structure of the axle input unit 100 will be described in detail later.

The axle output unit 200 serves to receive any one of the forward driving power and the reverse driving power from the axle input unit 100 or any one of the driving powers changed through multiple speeds, and transfer the received driving power to the wheel driving units III through a differential gear part 210.

Therefore, the axle output unit 200 may include the differential gear part 210, left and right axle shafts 221 and 222 extended from the differential gear part 210 to the left and right wheels LW and RW, and a brake part 230.

The differential gear part 210 may include a differential gear case part 211 and 212 formed by left and right differential gear cases 211 and 212 coupled to each other, differential pinion gears 218 having a pinion shaft 213 set to a rotating shaft thereof, the pinion shaft 213 being coupled to the differential gear case part 211 and 212, and differential side gears 214 and 215 which are engaged with the differential pinion gears 218 and finally connected to the axle shaft 220.

The left and right differential gear cases 211 and 212 may have left and right differential transfer gears 217 and 216 installed on the outer circumferential surfaces thereof, respectively, the left and right differential transfer gears 217 and 216 being formed in the shape of a spur gear.

The inner circumferential surface of the left differential gear case 211 forming the inside of the differential gear case part 211 and 212 is engaged with the outer surface of the left differential side gear 214 which is coupled to the leading end of the left axle shaft 221 inserted into the differential gear case part 211 and 212 through spline gear coupling.

The inner circumferential surface of the right differential gear case 212 forming the inside of the differential gear case part 211 and 212 is engaged with the outer surface of the right differential side gear 215 which is coupled to the leading end of the right axle shaft 222 inserted into the differential gear case part 211 and 212 through spline gear coupling.

The pinion shaft 213 of the differential pinion gears 218 is disposed perpendicular to the left and right axle shafts 221 and 222, and the differential pinion gears 218 installed at both ends of the pinion shaft 213 are engaged with the inner surfaces of the left and right differential side gears 214 and 215, respectively.

The power outputted by the differential gear part 210 may be transferred to the wheel driving units III formed at the left and right wheels LW and RW.

The wheel driving units III may include a left wheel driving unit III connected to the left wheel LW and a right wheel driving unit III connected to the right wheel RW. The power transferred from the differential gear part 210 rotates the left and right wheel driving units III in the same manner. Therefore, in the following descriptions, the left and right wheel driving units are not distinguished by the terms 'left' and 'right', but only the components of 'the wheel driving unit III' will be described in detail, for convenience of description.

The wheel driving unit III may include a brake part 230. At this time, any one of a dry brake and wet brake may be employed as the brake part 230, depending on a designer's selection. The present embodiment is based on the supposition that a wet brake is installed as the brake part.

As illustrated in FIG. 1, the wet brake part 230 may be disposed between the differential gear part 210 and the leading end of the left axle shaft 221 or between the differential gear part 210 and the leading end of the right axle shaft 222.

The wet brake part 230 may include a brake piston (not illustrated), a brake disk 232 and a pad 231. The brake piston may brake the axle shaft 220, and the brake disk 232 and the pad 231 may rub against each other through the brake piston. When the brake disk 232 and the pad 231 are pressed against each other, the axle shaft 220 and a sun gear 311 of a reduction gear part 300 integrated with the axle shaft 220 may be braked.

The reduction gear part 300 is installed at each of the leading ends of the left and right axle shafts 221 and 222.

In the power train system and the vehicle including the same according to the present embodiment, the reduction gear part 300 may be implemented with a double planetary gear set. That is, the double planetary gear set may include a first planetary gear set 310 disposed adjacent to the axle shaft 220 and a second planetary gear set 320 disposed adjacent to the left or right wheel LW or RW.

As illustrated in FIG. 1, the first planetary gear set 310 may include a first sun gear 311, a plurality of planetary gears 312, a first ring gear 313, and a first carrier 314. The first sun gear 311 is integrated with the leading end of the axle shaft 220, the plurality of planetary gears 312 are engaged with the first sun gear 311 and revolved and rotated according to a rotation operation of the first sun gear 311, the first ring gear 313 is fixed in the axle housing (with no reference numeral) so as to surround the plurality of first planetary gears 312, and has an inner circumferential surface engaged with the plurality of first planetary gears 312 at the same time, and the first carrier 314 is connected to the rotation centers of the plurality of first planetary gears 312, and rotated in the revolution direction of the plurality of first planetary gears 312.

The second planetary gear set 322 may include a second sun gear 321, a plurality of second planetary gears 322, a second ring gear 323, and a second carrier 324. The second sun gear 321 is coaxially connected to a rotating shaft of the first carrier 314, the plurality of planetary gears 322 are engaged with the second sun gear 321, and revolved and rotated according to a rotation operation of the second sun gear 321, the second ring gear 323 is fixed in the axle housing so as to surround the second planetary gears 322, and has an inner circumferential surface engaged with the plurality of second planetary gears 322 at the same time, and the second carrier 324 is connected to the rotation centers of the plurality of second planetary gears 322 and rotated in the revolution direction of the plurality of second planetary gears 322.

The second carrier 324 is connected to the left and right wheels LW and RW, and finally transfers a reduced rotational power to the left and right wheels LW and RW.

As such, the power train system and the vehicle including the same according to the present embodiment may include the reduction gear parts 300 which are installed between the leading ends of the left and right axle shafts 220 and the left and right wheels, respectively, and implemented with a double planetary gear set. Thus, the whole load of the axle output unit 220 connected to the differential gear part 210 and the left and right axle shafts 221 and 222 can be distributed.

The whole length and width of a heavy equipment vehicle such as a forklift truck is shorter than those of a commercial vehicle. Thus, the heavy equipment vehicle has a design issue that most components such as a power generator, power converter and power transfer unit are inevitably concentrated in the middle of the vehicle body under the driver's seat. Furthermore, since a transmission assembly of the heavy equipment vehicle includes a plurality of components coupled to one shaft of the axle shaft 220 composed of the left and right axle shafts 220, the entire volume of the heavy equipment vehicle is increased. The increase of the volume may raise the manufacturing cost of the transmission housing that supports the load of the transmission assembly while forming the exterior of the transmission assembly. Moreover, individual components constituting the power converter and the power transfer unit are implemented with a number of gear assemblies. Since such a structure requires a process of manufacturing delicate gears, the manufacturing cost is inevitably increased.

The power train system and the vehicle including the same according to the present embodiment are designed in such a manner that the reduction gear part 300 which increases an output torque while reducing a transferred driving power is positioned at the outer end of the axle shaft 220 instead of the central portion of the axle shaft, and includes a double planetary gear set for accomplishing a high-torque output. Thus, the axle input unit 100 can be separated from the axle output unit 200 of which the load may be concentrated on the axle shaft 220, which makes it possible to not only distribute the whole load of the axle output unit 200, but also remove the existing torque converter 3.

Hereafter, various embodiments which can be implemented by changing the position and structure design of the reduction gear part 300 will be described in detail.

Figure 2:
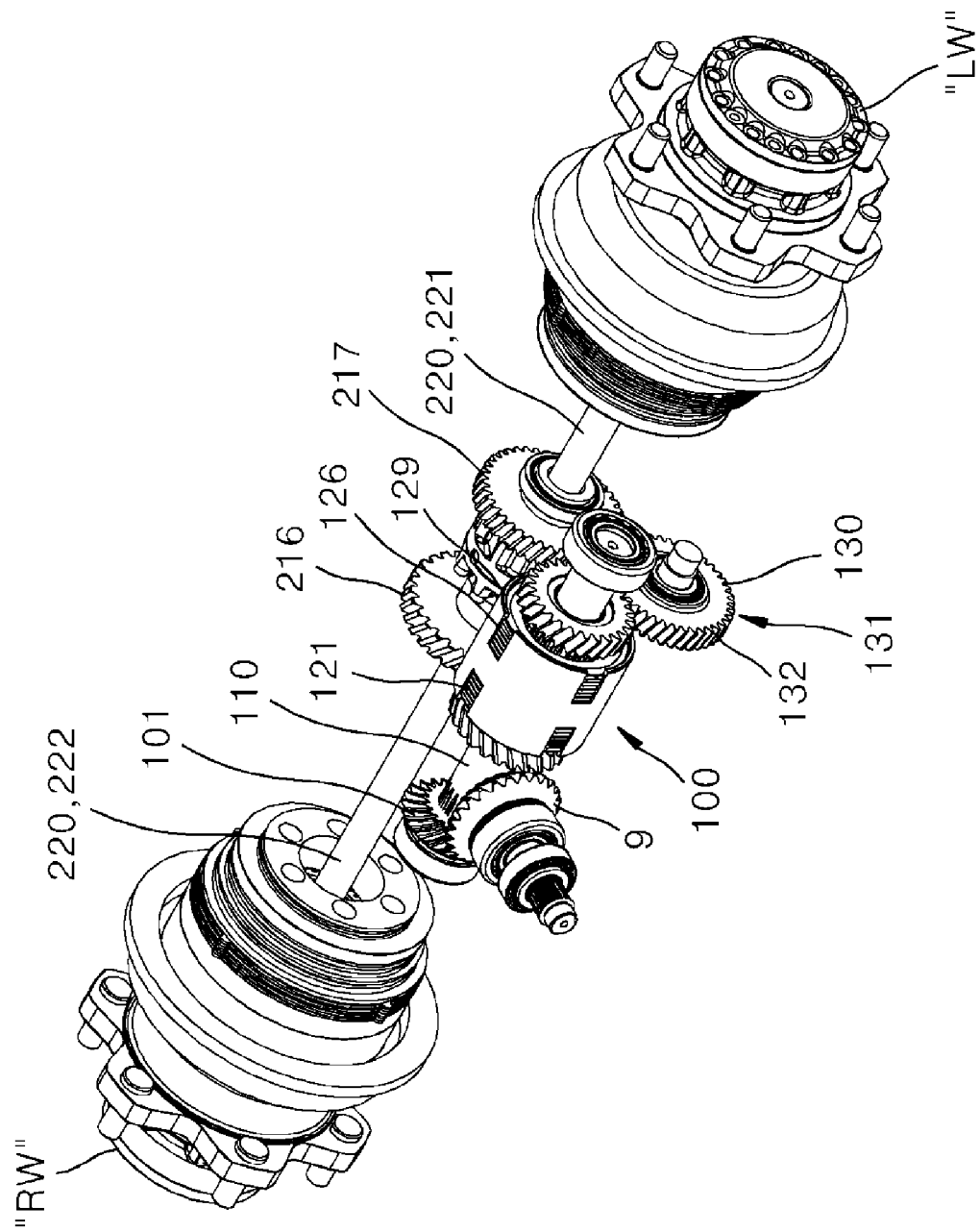
FIG. 2 is a perspective view illustrating an example of a second transmission unit II among components of the power train system according to the embodiment of the present disclosure.
Figure 3:
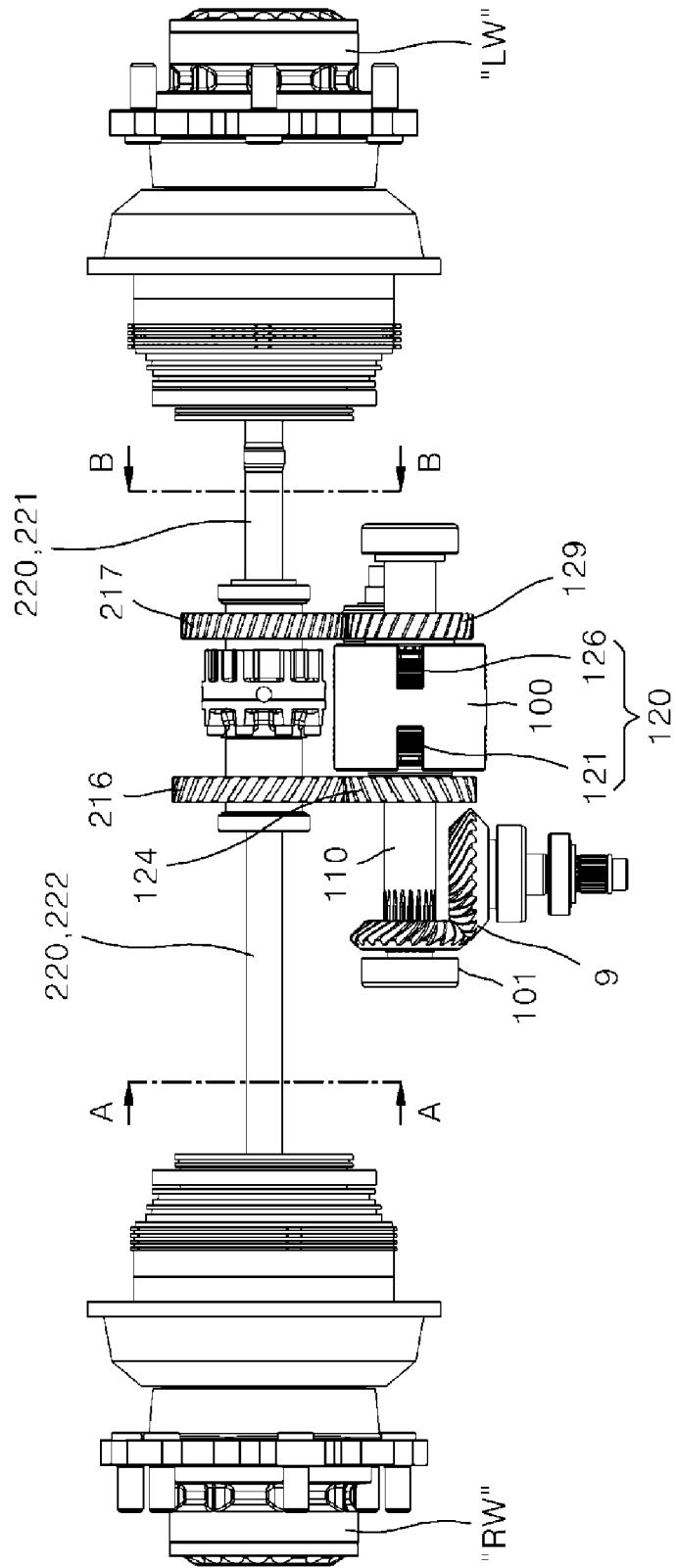
FIG. 3 is a front view of FIG. 2.
Figure 4:
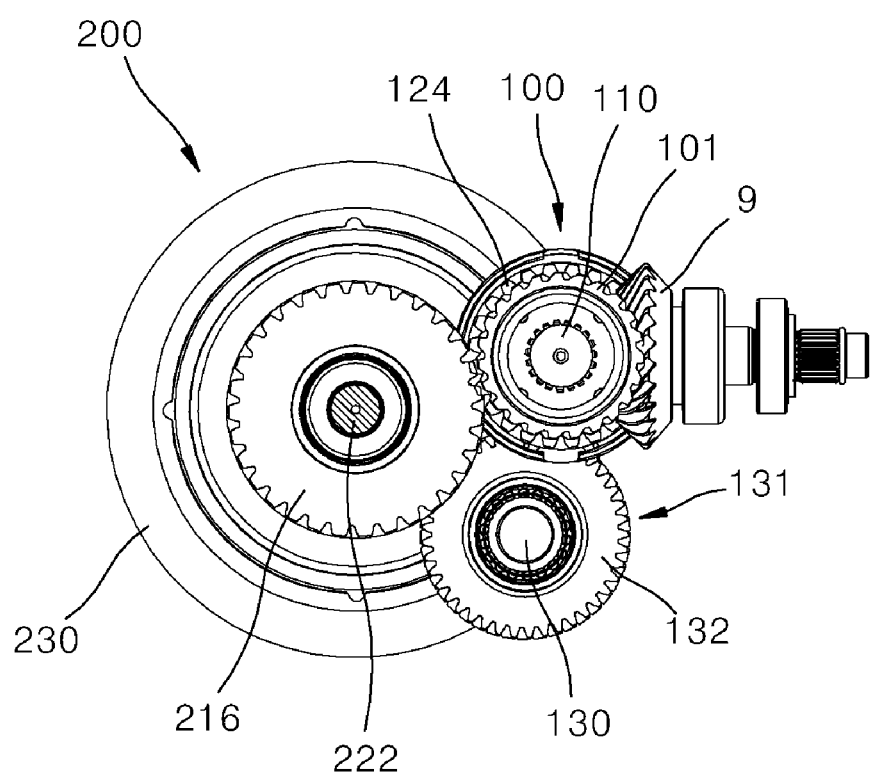
FIG. 4 is a cross-sectional view taken along the line A-A of FIG. 3.
Figure 5:
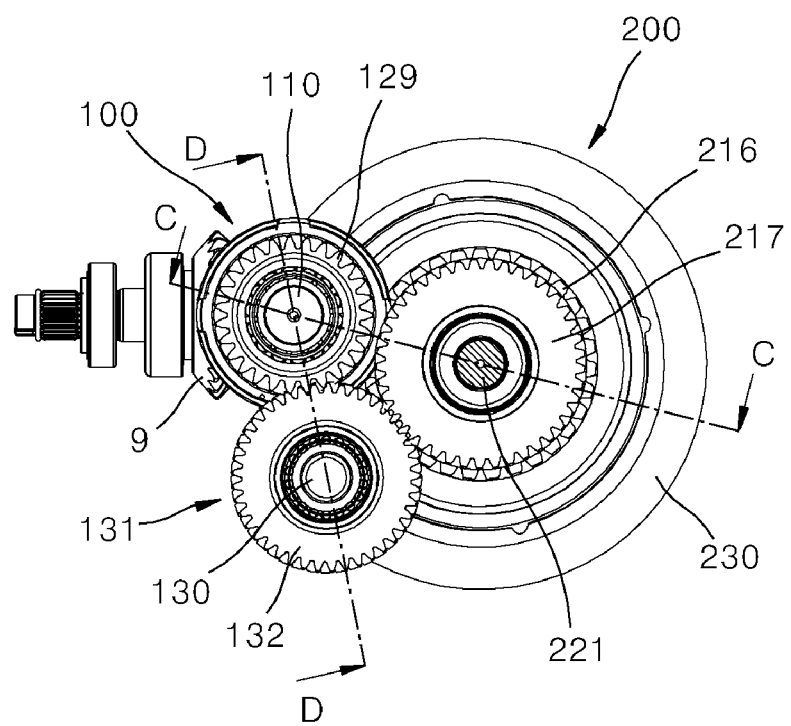
FIG. 5 is a cross-sectional view taken along the line B-B of FIG. 3.
Figure 6:
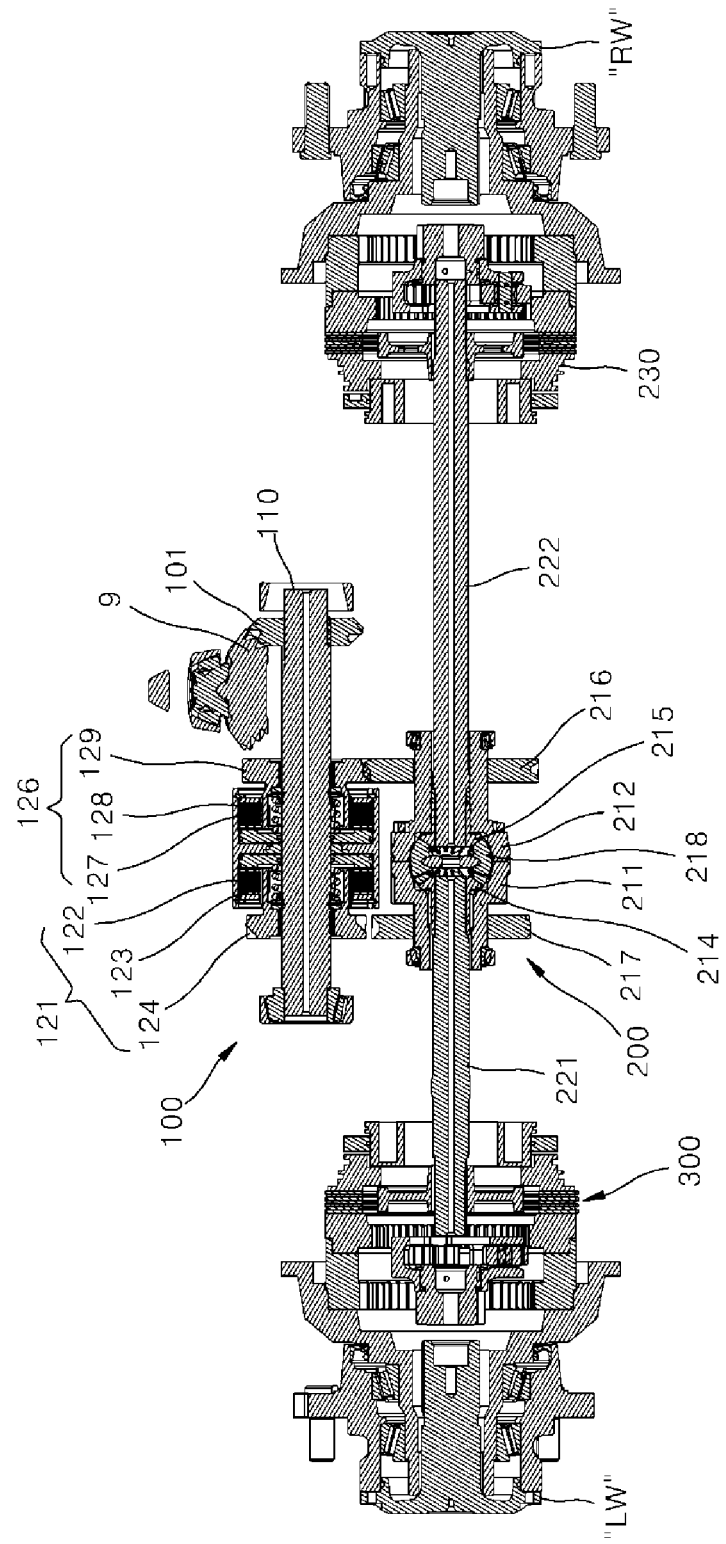
FIG. 6 is a cross-sectional view taken along the line C-C of FIG. 5.
Figure 7:
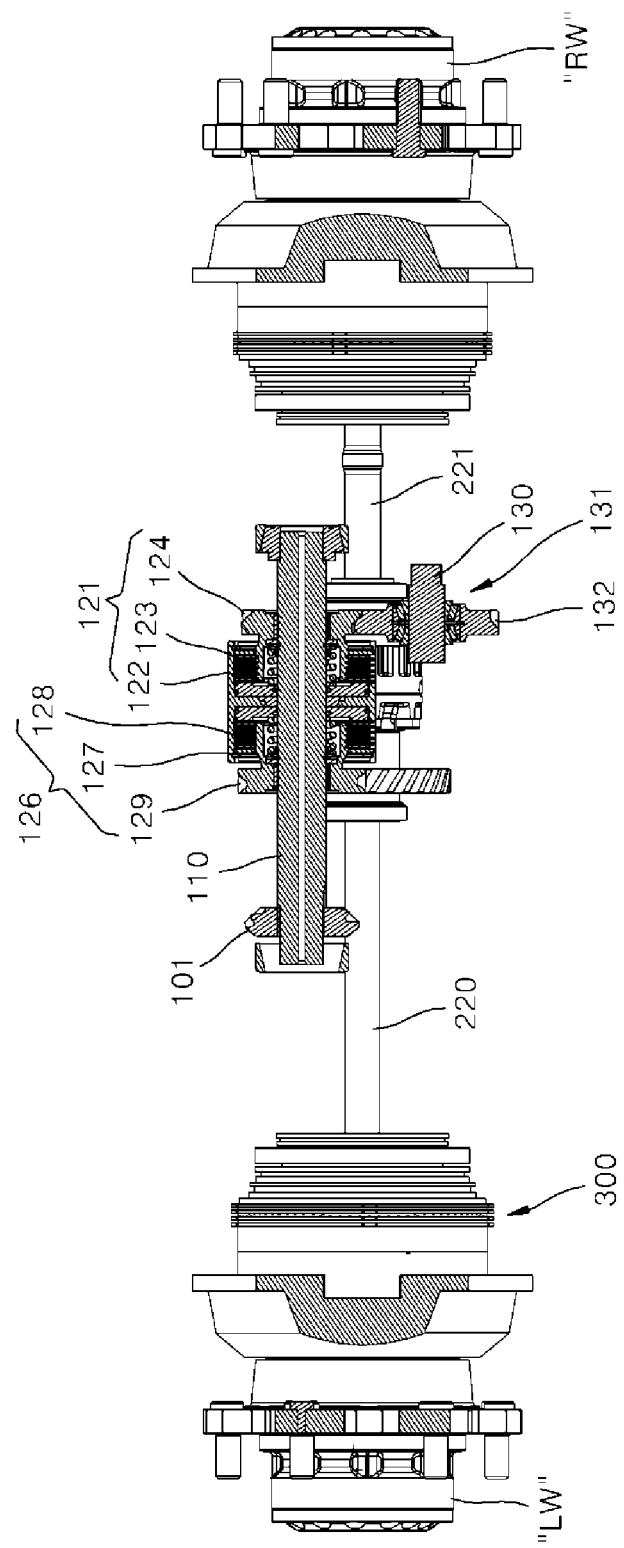
FIG. 7 is a cross-sectional view taken along the line D-D of FIG. 5.
Figure 8A:
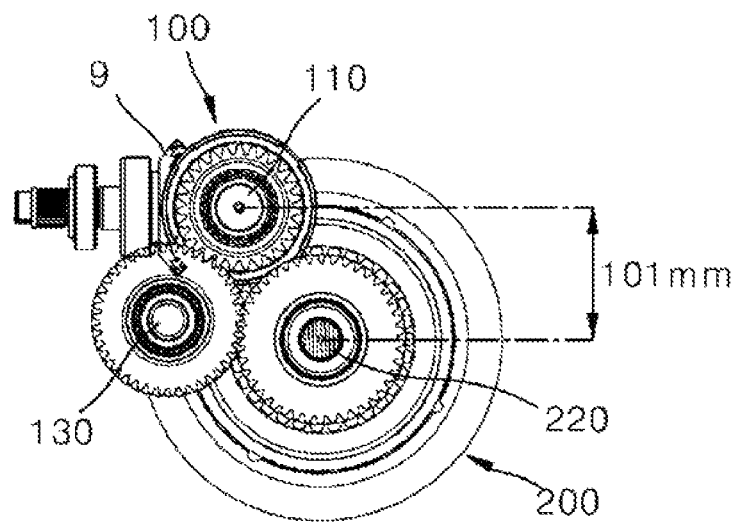
FIGS. 8A to 8D are side views illustrating operation effects of the power train system through the second transmission unit.
Figure 8B:
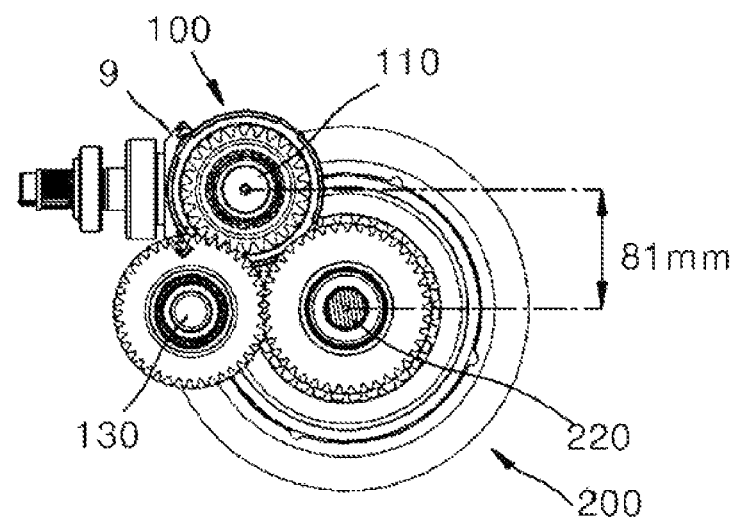
Figure 8C:
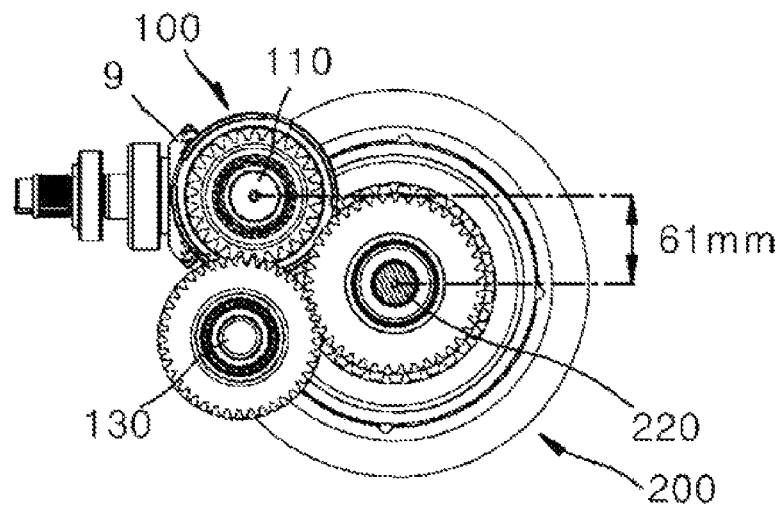
Figure 8D:
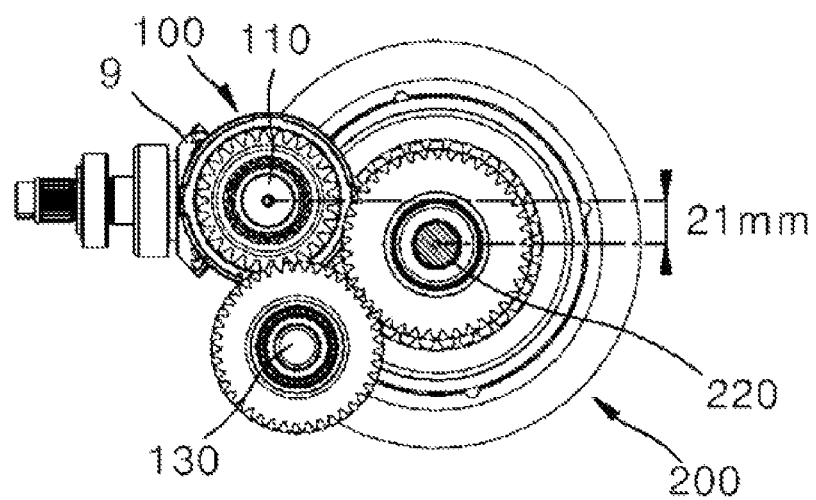
Figure 9A:
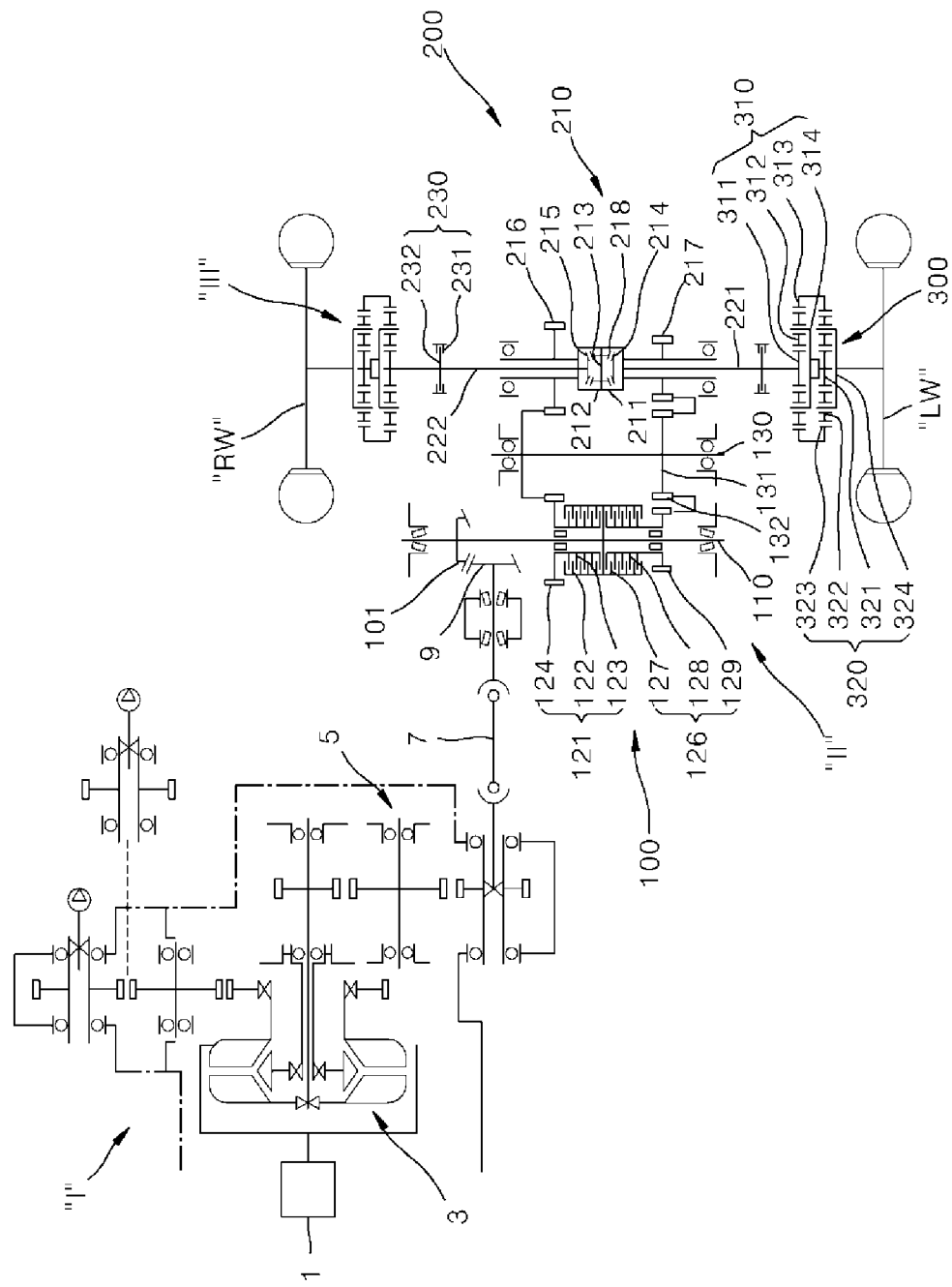
FIGS. 9A to 9C illustrate power transfer processes during a neutral mode, a forward driving mode and a reverse driving mode through the second transmission unit according to the example of FIG. 2.
Figure 9B:
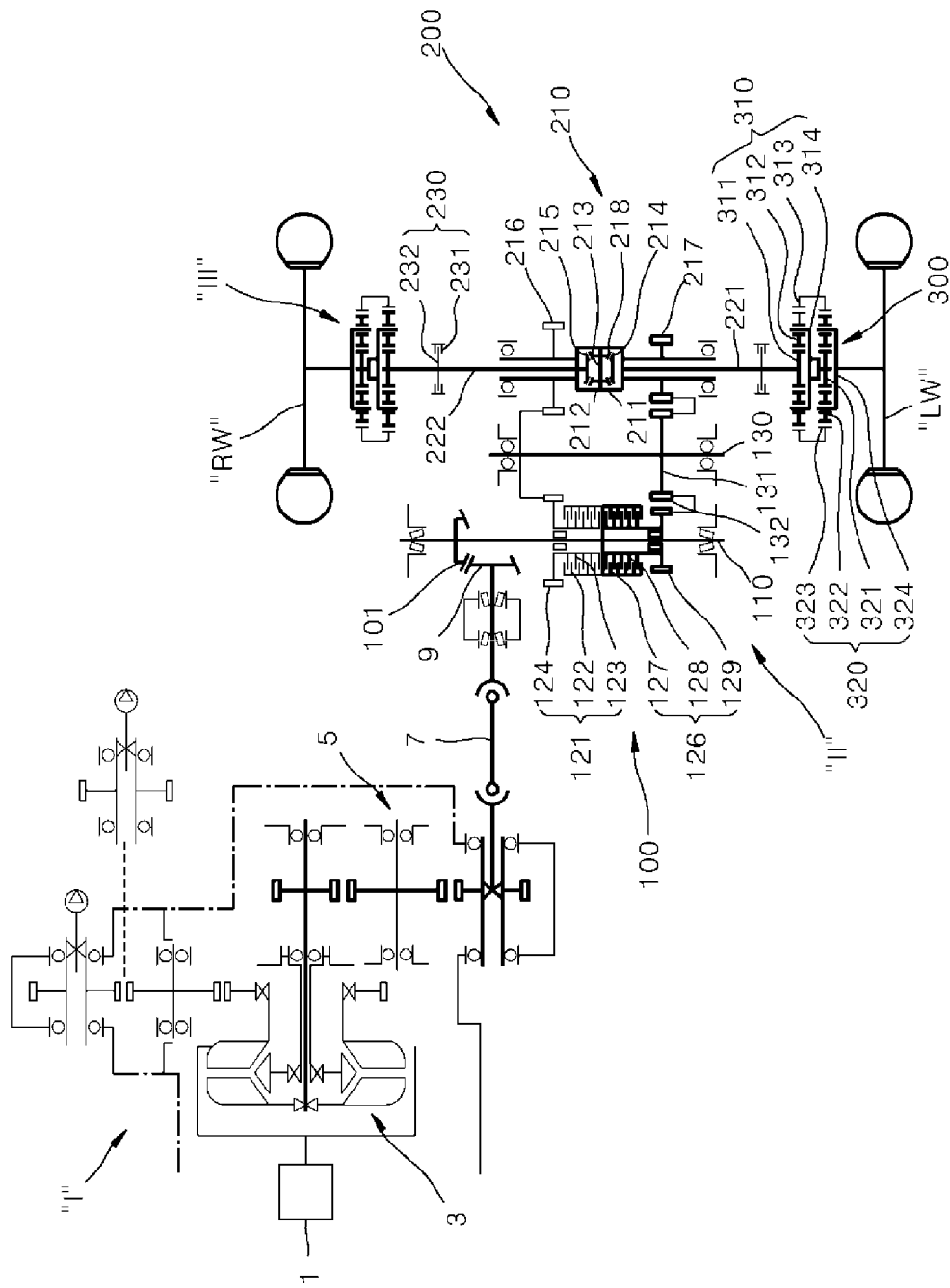
Figure 9C:
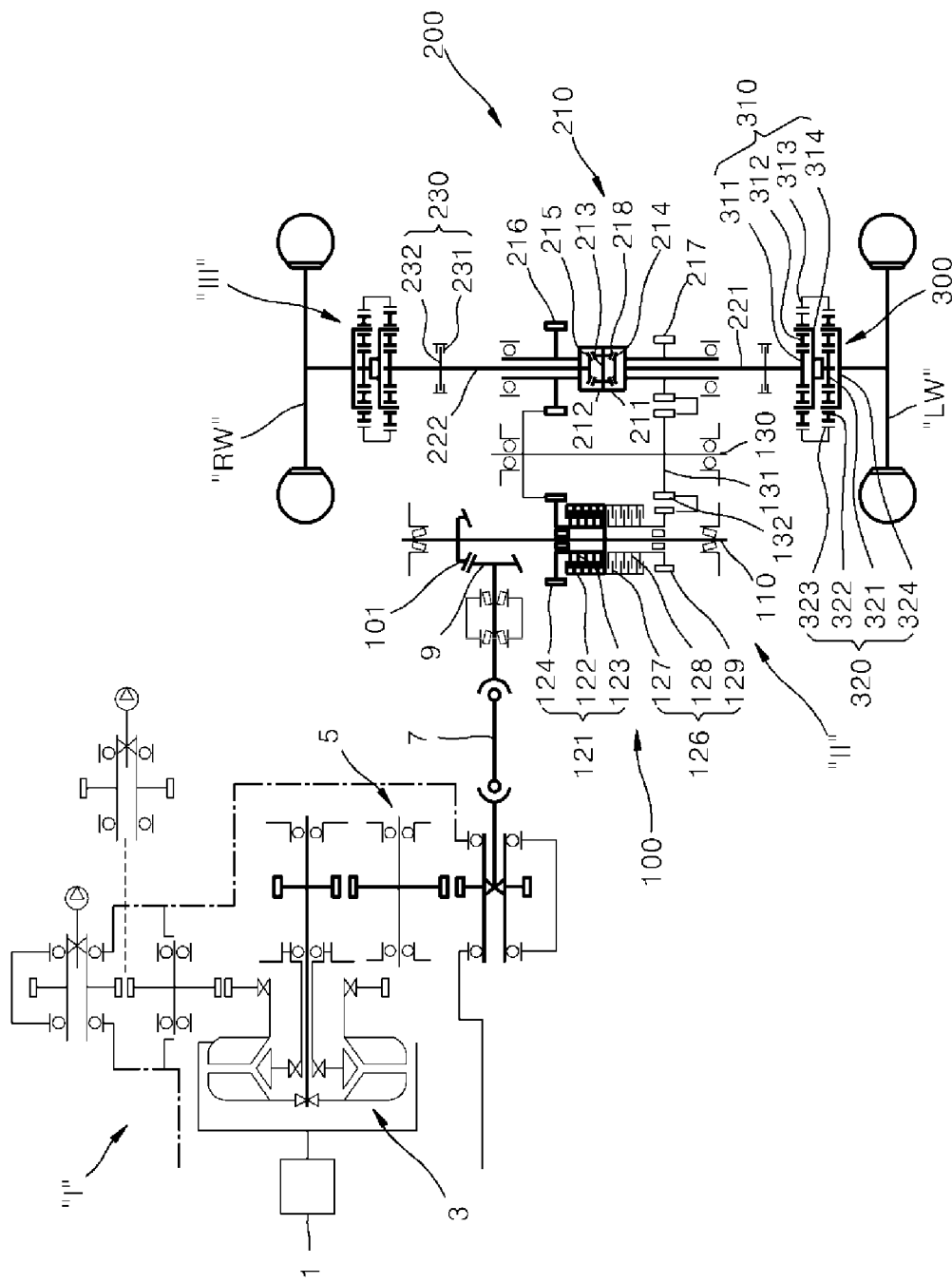

FIG. 2 is a perspective view illustrating an example of the second transmission unit II among the components of the power train system and the vehicle including the same according to the embodiment of the present disclosure, FIG. 3 is a front view of FIG. 2, FIG. 4 is a cross-sectional view taken along the line A-A of FIG. 3, FIG. 5 is a cross-sectional view taken along the line B-B of FIG. 3, FIG. 6 is a cross-sectional view taken along the line C-C of FIG. 5, FIG. 7 is a cross-sectional view taken along the line D-D of FIG. 5, FIGS. 8A to 8D are side views illustrating an operation effect of the power train system through the second transmission unit II, and FIGS. 9A and 9C illustrates power transfer processes during a neutral mode, a forward drive mode and a reverse drive mode through the second transmission unit II according to the example of FIG. 2.

Among the components of the power train system and the vehicle including the same according to the present embodiment, the second transmission unit II receives a driving power of the first transmission unit I through the bevel gear 9 of the bevel gear part installed at the leading end of the propeller shaft 7, as illustrated in FIGS. 2 to 8.

The bevel gear part and the axle input unit 100 are connected perpendicular to each other through the bevel gear 9, and the axle input unit 100 and the axle output unit 200 are disposed in parallel to each other with an idler part 131 disposed therebetween, and spaced a predetermined distance from each other.

As illustrated in FIGS. 2 to 8, the second transmission unit II may further include the idler part 131 which is installed between the axle input unit 100 and the axle output unit 200, and rotated only when power inputted by the axle input unit 100 is any one of a forward driving power and reverse driving power, but not rotated when the power inputted by the axle input unit 100 is a different driving power.

The first transmission unit I may further include a torque converter 3 which converts the torque of a rotational power, before inputting the rotational power to the axle input unit 100 of the second transmission unit II. The torque converter 3 includes a torque converter clutch to control an output shaft of the power generator 1 and an input shaft of the first transmission unit I, which have no reference numerals.

The driving torque outputted by the torque converter 3 is transferred to the axle input unit 100 of the second transmission unit II through the propeller shaft 7 having the bevel gear 9 installed at the leading end thereof. As is publicly known, the propeller shaft 7 is rotated through a universal joint coupling between one end and the other end thereof, and performs an addition function of absorbing a height change of the vehicle body by a suspension system (not illustrated).

The axle input unit 100 is separated from the axle shaft 220 of the axle output unit 200, receives power from the bevel gear part through an input driving shaft 110 described later, and transfers the received power to the axle output unit 200. More specifically, the axle input unit 100 includes the input driving shaft 110, a beveling gear 101, and a forward/reverse clutch part 121 and 126. The input driving shaft 110 is disposed perpendicular to the bevel gear rotating shaft corresponding to the rotation center of the bevel gear 9, the beveling gear 101 is formed on the outer circumferential surface of the input driving shaft 110, and the forward/reverse clutch part 121 and 126 is disposed on the outer circumference of the input driving shaft 110, and selectively switches a driving power to a forward driving power or reverse driving power, depending on whether operation oil is supplied.

The input driving shaft 110 includes a forward drive gear 129 and reverse drive gear 124 installed on the outer circumferential surface thereof. The forward drive gear 129 and the reverse drive gear 124 are installed at one side and the other side of the input driving shaft 110 with forward/reverse clutch part 121 and 126 interposed therebetween, and selectively rotated with the input driving shaft 110 according to an operation of the forward/reverse clutch part 121 and 126.

The forward/reverse clutch part 121 and 126 includes a forward clutch part 121 and a reverse clutch part 126. The forward clutch part 121 is disposed at the forward drive gear 129, and fixes the input driving shaft 110 to the forward drive gear 129 depending on whether operation oil is supplied, and the reverse clutch part 126 is disposed at the reverse drive gear 124, and fixes the input driving shaft 110 to the reverse drive gear 124 depending on whether operation oil is supplied.

In other words, when operation oil is supplied to the forward clutch part 121 through a flow path, friction members of the forward clutch part 121 are pressed against each other to fix the input driving shaft 110 to the forward drive gear 129. Then, when the input driving shaft 110 is rotated, the forward drive gear 129 is rotated while the reverse drive gear 124 is stopped. The friction members may include a friction plate and friction disk which will be described later.

On the other hand, when operation oil is supplied to the reverse clutch part 126 through a flow path, friction members of the reverse clutch part 126 are pressed against each other to fix the input driving shaft 110 to the reverse drive gear 124. Then, when the input driving shaft 110 is rotated, the reverse drive gear 124 is rotated to output only a reverse driving power, while the forward drive gear 129 is stopped. The friction members of the reverse clutch part 126 include a friction plate and friction disk which will be described later.

More specifically, the forward clutch part 121 may include a hollow forward clutch drum (not illustrated), a ring-shaped forward piston (not illustrated), one or more ring-shaped friction plates 122, a forward coupling and one or more ring-shaped friction disks 123. The hollow forward clutch drum has a cylinder installed at one side of the inside thereof, the ring-shaped forward piston is installed in the cylinder while being supported by a spring, and moved in the longitudinal direction of the input driving shaft 110 by hydraulic pressure when operation oil is supplied, the one or more ring-shaped friction plates 122 are coupled to the inner circumferential surface of the forward clutch drum at the other side of the inside of the forward clutch drum so as to be spaced from each other, the forward coupling is coupled to the input driving shaft 110 and extended into the forward clutch drum, and the one or more ring-shaped friction disks 123 are coupled to the outer circumferential surface of the forward coupling, such that the friction plates 122 and the friction disks 123 are alternately arranged while both side surfaces thereof are maintained at a predetermined distance.

Similarly, the reverse clutch part 126 may include a hollow reverse clutch drum (not illustrated), a ring-shaped reverse piston (not illustrated), one or more ring-shaped friction plates 127, a reverse coupling and one or more ring-shaped friction disks 128. The hollow reverse clutch drum has a cylinder installed at one side of the inside thereof, the ring-shaped reverse piston is installed in the cylinder while being supported by a spring, and moved in the longitudinal direction of the input driving shaft 110 by hydraulic pressure when operation oil is supplied, the one or more ring-shaped friction plates 128 are coupled to the inner circumferential surface of the reverse clutch drum at the other side of the inside of the reverse clutch drum so as to be spaced from each other, the reverse coupling is coupled to the input driving shaft 110 and extended into the reverse clutch drum, and the one or more ring-shaped friction disks 128 are coupled to the outer circumferential surface of the reverse coupling, such that the friction plates 127 and the friction disks 128 are alternately arranged while both side surfaces thereof are maintained at a predetermined distance.

The power train system and the vehicle including the same according to the present embodiment are implemented as a positive system in which the friction plates 122 and 127 and the friction disks 123 and 128 are pressed against each other when operation oil is supplied. However, the present embodiment is not limited thereto. The power train system and the vehicle including the same according to the present embodiment can be implemented as a negative system in which the friction plates 122 and 127 and the friction disks 123 and 128 are pressed against each other at normal times, but separated from each other and fixed to the input driving shaft 110 when operation oil is supplied.

As such, the rotational power outputted from the axle input unit 100 by operation oil which is selectively supplied through the forward clutch part 121 or the reverse clutch part 126 may be transferred as a forward driving power or reverse driving power to the axle output unit 200, or the power of the axle input unit 100 may be controlled not to be outputted to the axle output unit 200, in order to maintain the neutral mode.

As illustrated in FIG. 4, the idler part 131 is disposed between the input driving shaft 110 and the axle shaft 220, and includes an idle gear 132 having an idler shaft 130 disposed in parallel to the input driving shaft 110 and the axle shaft 220.

As illustrated in FIGS. 4 and 5, one side of the outer circumferential surface of the idle gear 132 is engaged with any one of the forward drive gear 129 and the reverse drive gear 124, and the other side of the outer circumferential surface of the idle gear 132 is engaged with any one of the left and right differential transfer gears 217 and 216 installed in the left and right differential gear cases 211 and 212 described later, respectively.

The power train system and the vehicle including the same according to the present embodiment may have a structure in which one side of the idle gear 132 in the idler part 131 is engaged with the forward drive gear 129, and the other side of the idle gear 132 is engaged with the left differential transfer gear 217 of the left differential gear case 211. However, the one side of the idle gear 132 may be engaged with the reverse drive gear 124, and the other side of the idle gear 132 may be engaged with the right differential transfer gear 216 of the right differential gear case 212. At this time, the rotation direction of the rotational power inputted from the first transmission unit I may be reversed.

The idle gear 132 is engaged with only the forward drive gear 129 between the forward and reverse drive gears 129 and 124, such that an output driving power inputted to the axle output unit 200 is classified into a forward driving power transferred through the axle input unit 100—the idler unit 131—the axle output unit 220 and a reverse driving power transferred through the axle input unit 100—the axle output unit 200.

The forward driving power or the reverse driving power inputted from the axle input unit 100 is selectively transferred to the differential gear part 210 through the idle gear 132 of the idler part 131, and the differential gear part 210 outputs the driving power to rotate the left and right axle shafts 221 and 222 in the same direction.

In the power train system and the vehicle including the same according to the present embodiment, the second transmission unit II according to the example of FIG. 2 has a structure in which the forward/reverse clutch part 121 and 126 which may be directly coupled to the axle shaft 220 is disposed outside so as to be separated from the axle shaft 220, as illustrated in FIGS. 2 to 7. Thus, the second transmission unit II can simplify the entire structure of the axle shaft 220 including the differential gear part 210.

That is, as illustrated in FIGS. 8A to 8D, the axle input unit 100 can be fixed at a predetermined position in the circumferential direction of the axle shaft 220, while a connection angle formed by the axial centers of the input driving shaft 110 and the bevel gear rotating shaft of the bevel gear part is fixed.

More specifically, the axle input unit 100 can be fixed at a predetermined position in a semicircle range corresponding to a side where the axle input unit 100 is installed, based on an arbitrary vertical line passing through the axial center of the input driving shaft 110.

This may indicate that the axle input unit 100 can be fixed at a predetermined position in a semicircle range corresponding to the side where the axle input unit 100 is installed, based on an arbitrary vertical line passing through the axial centers of the left and right differential transfer gears 217 and 216.

Furthermore, while one side of the idler part is connected to the forward drive gear 129 of the forward clutch part 121 and the other side of the idler part is connected to any one of the left and right differential transfer gears 217 and 216, the reverse drive gear 124 of the reverse clutch part 126 in the axle input unit 100 can be engaged with a predetermined position in a semicircle range corresponding to the side where the axle input unit 100 is installed, based on an arbitrary vertical line passing through the axial center of the other of the left and right differential transfer gears 217 and 216.

At this time, one side of the idle gear of the idler part may be engaged with the forward drive gear 129, and the other side of the idle gear may be engaged with the left differential transfer gear 217.

More specifically, as illustrated in FIGS. 8A to 8D, the idler shaft 130 of the idler part 131 may be additionally installed as an intermediate shaft between the axle input unit 100 and the axle shaft 220. Thus, the vertical height of the rotating shaft of the bevel gear part with respect to the rotation center of the axle shaft 220 can be flexibly designed along the circumferential direction of the axle shaft 220.

In the related art, the rotating shaft of the bevel gear part and the rotating shaft of the beveling gear 101 (that is, the center axis of the axle shaft 220) have a limited degree of freedom in design due to the power transmission characteristic of the bevel gear 9. In the second transmission unit II according to the present embodiment, however, the beveling gear 101 engaged with the bevel gear 9 may be installed on the input driving shaft 110 of the axle input unit 100 separated from the axle shaft 220, such that the bevel gear 9 and the beveling gear 101 can be fixed at positions having the best gear engagement efficiency. Moreover, as long as the gear engagement efficiency is not degraded, the bevel gear part and the axle input unit 100 can be freely positioned along the circumferential direction of the axle output unit 200.

Therefore, the axle housing (not illustrated) can be designed to have a slim structure, and the degree of freedom in design for the external shape of the axle housing can be increased. Thus, the product can be designed to have a small size.

In the power train system and the vehicle including the same according to the present embodiment, speed change processes through the second transmission unit II during the neutral state, the forward driving mode and the reverse driving mode will be described in detail with reference to FIGS. 9A to 9C.

First, the neutral mode will be described.

During the neutral mode as illustrated in FIG. 9A, operation oil is not supplied to both of the forward and reverse clutch parts 121 and 126. Therefore, although a rotational power is inputted to the input driving shaft through the bevel gear 9 of the bevel gear part from the power generator 1 or the power converter, none of the forward clutch part 121 and the reverse clutch part 126 are operated because no hydraulic pressure is supplied to the forward/reverse clutch part 121 and 126. In this case, since the forward drive gear 129 and the reverse drive gear 124 are not rotated, power transmission is not performed. That is, the neutral mode is achieved.

Next, the forward driving mode will be described.

Referring to FIG. 9B, a power transfer process in which forward driving is achieved by the forward/reverse clutch part 121 and 126 will be described as follows. That is, a rotational power inputted to the forward/reverse clutch part 121 and 126 through the bevel gear 9 of the bevel gear part from the driving source may rotate the forward drive gear 129 while the forward clutch part 121 and the input driving shaft 110 are fixed to each other depending on whether operation oil is supplied. At this time, the idle gear 132 of the idler part 131 may be engaged and rotated with the forward drive gear 129, and rotate the left differential transfer gear 217. The rotation of the left differential transfer gear 217 may forward drive the left axle shaft 221 and the right axle shaft 222.

When the axle shaft 220 is forward driven, the axle shaft 220 is decelerated by the reduction gear part 300 including a double planetary gear set, and finally forward drives the left wheel LW and the right wheel RW.

Finally, the reverse driving mode will be described.

Referring to FIG. 9C, a power transfer process in which reverse driving is achieved by the forward/reverse clutch part 121 and 126 will be described as follows. That is, a rotational power inputted to the forward/reverse clutch part 121 and 126 through the bevel gear 9 of the bevel gear part from the driving source may rotate the reverse drive gear 124, while the reverse clutch part 126 and the input driving shaft 110 are fixed to each other depending on whether operation oil is supplied. At this time, the reverse drive gear 124 may be directly engaged with the right differential transfer gear 216 and rotate the right differential transfer gear 216, and the rotation of the right differential transfer gear 216 may reversely drive the right axle shaft 222 and the left axle shaft 221.

Similarly, when the axle shaft 220 is reversely driven, the axle shaft 220 is decelerated by the reduction gear part 300 including a double planetary gear set, and finally reversely drive the left wheel LW and the right wheel RW.

In the power train system and the vehicle including the same according to the present embodiment, the second transmission unit II may include the axle input unit 100 having the forward/reverse clutch part 121 and 126 such that the input driving shaft 110 is separated from the differential gear part 210 or the axle shaft 220 and disposed in parallel to the differential gear part 210 or the axle shaft 220, thereby increasing the degree of freedom in design.

Figure 10:
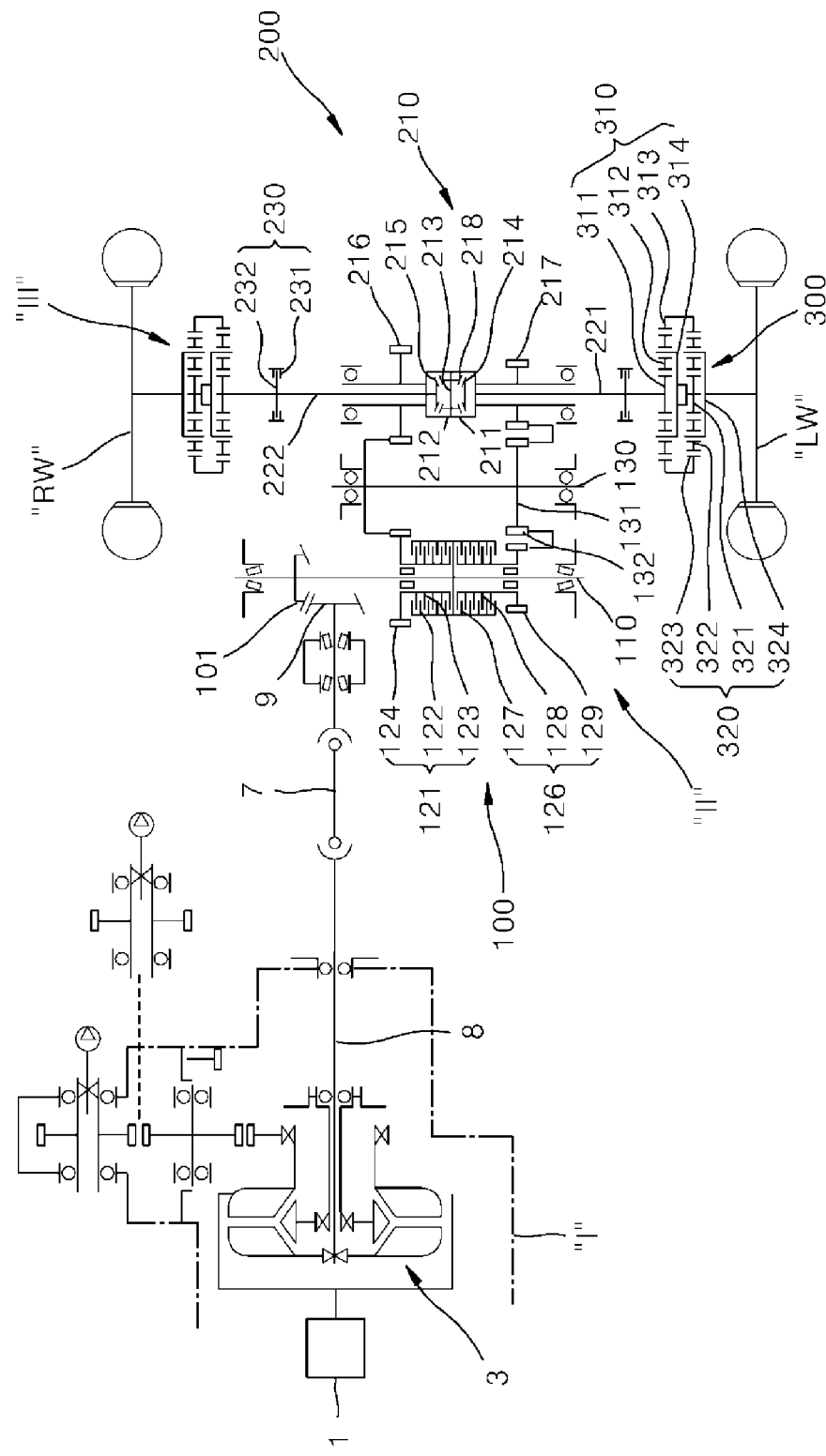
FIG. 10 is a configuration diagram illustrating an example of a first transmission unit I in the power train system according to the embodiment of the present disclosure.

FIG. 10 is a configuration diagram illustrating an example of the first transmission unit I among the components of the power train system and the vehicle including the same according to the embodiment of the present disclosure.

As illustrated in FIG. 10, the above-described second transmission unit II can create a new advantage in that the output end of the torque converter 3 installed in the first transmission unit I and the propeller shaft 7 can be directly connected to each other on one axis. The output end may correspond to an output shaft 8 of FIGS. 14 to 15E which will be described later.

The related art has a design issue in that the output shaft of the engine, the rotating shaft of the propeller shaft 7 and the differential gear must be designed to be positioned on one axis, in order to directly connect the output end of the torque converter 3 to the propeller shaft 7. Therefore, when the output shaft of the engine, the rotating shaft of the propeller shaft 7 and the differential gear part 210 are not positioned on one axis due to the difficulty in design or limitation in structure design, a compensation gear part 5 is necessarily installed as illustrated in FIG. 1. The compensation gear part 5 is engaged with a transfer gear installed on the output shaft of the torque converter 3, in order to transfer a driving power.

In the power train system and the vehicle including the same according to the present embodiment, however, the second transmission unit II includes the input driving shaft 110 separated from the axle shaft 220. Thus, by properly changing the formation position of the beveling gear 101 integrated with the input driving shaft 110 without directly connecting the bevel gear 9 corresponding to the input end of the propeller shaft 7 to the differential gear part 210, the output end (or the output shaft 8) of the torque converter 3 and the propeller shaft 7 can be designed to be directly connected to each other on one axis.

That is, when the first transmission unit I further includes the compensation gear part 5 and the output end of the torque converter 3 and the propeller shaft 7 are directly connected to each other on one axis, the installation position of the beveling gear 101 on the input driving shaft 110 can be designed in a different manner from when the first transmission unit I does not include the compensation gear part 5 and the output end of the torque converter 3 and the propeller shaft 7 are not directly connected to each other on one axis. This structure can be applied in the same manner for the installation position of a multi-stage driving shaft 511 of a beveling gear 501 in another example of the second transmission unit II which will be described later.

In the power train system and the vehicle including the same according to the present embodiment, the operation of the second transmission unit II according to the example of FIG. 2 is limited to the neutral mode, the forward driving mode (first forward speed mode) and the reverse driving mode (first reverse speed mode).

Therefore, the present disclosure suggests another example of the second transmission unit II which includes the neutral mode, two forward speed modes and two reverse speed modes.

Figure 11:
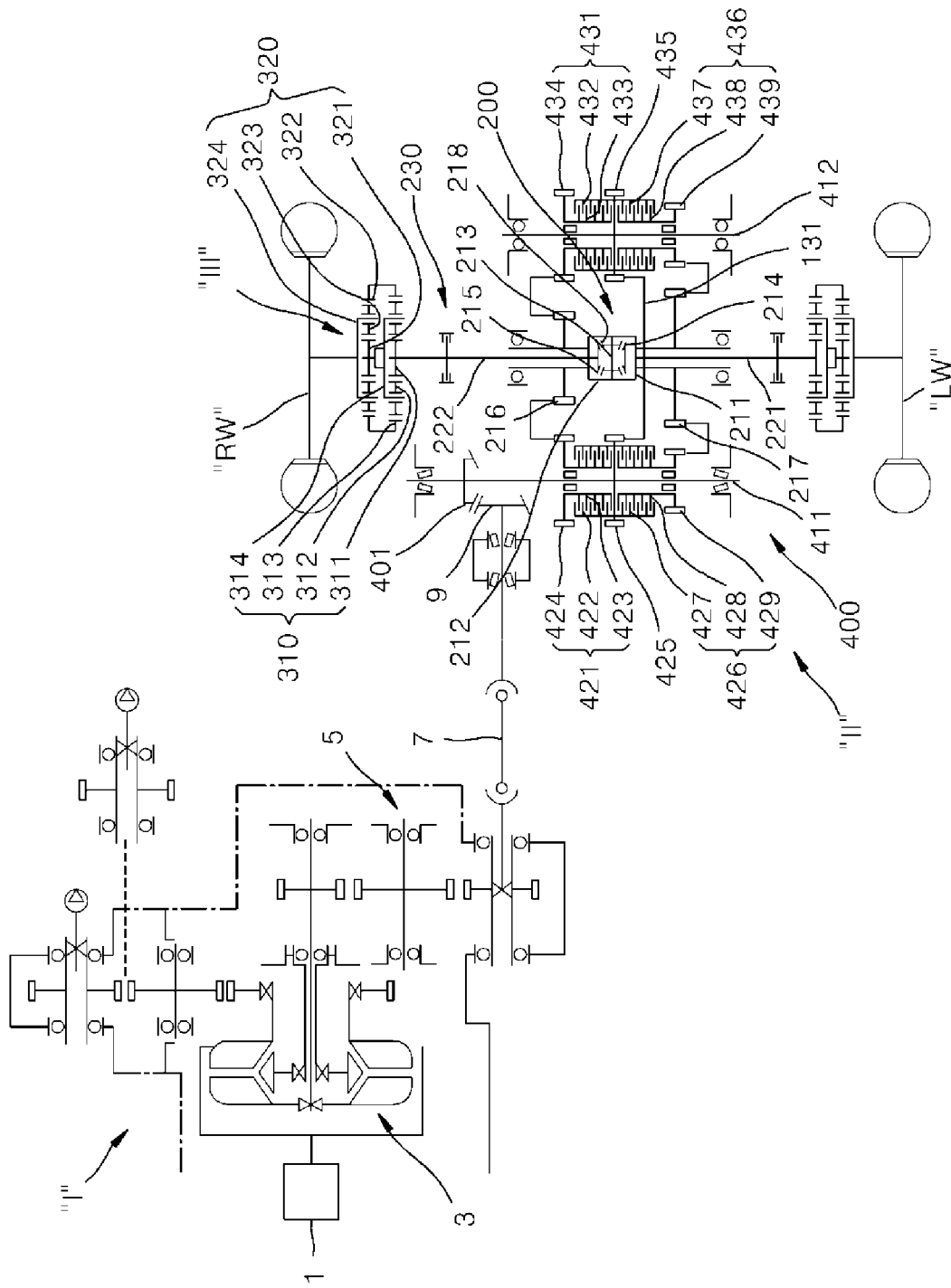
FIG. 11 is a configuration diagram illustrating another example of the second transmission unit in the power train system and the vehicle including the same according to the embodiment of the present disclosure.

FIG. 11 is a configuration diagram illustrating another example of the second transmission unit II in the power train system and the vehicle including the same according to the embodiment of the present disclosure.

In the power train system and the vehicle including the same according to the present embodiment, the second transmission unit II according to the example of FIG. 11 may include an axle input unit 400 and an axle output unit 200. The axle input unit 400 is connected to the bevel gear 9 of the bevel gear part, receives a driving power of the first transmission unit I, and selectively changes the received driving power to the first and second forward speeds and the first and second reverse speeds, and the axle output unit 200 receives the driving power outputted from the axle input unit 400, and outputs the received driving power to the wheel driving units III connected to the left wheel LW and the right wheel RW.

As illustrated in FIG. 11, the axle input unit 400 may include a reverse driving input part 421 and 426 and a forward driving input part 431 and 436. The reverse driving input part 421 and 426 receives the driving power outputted from the bevel gear 9 of the bevel gear part, and switches the received driving power to any one of the first and second reverse speeds, and the forward driving input part 431 and 436 receives the driving power outputted from the bevel gear 9 of the bevel gear part, and switches the received driving power to any one of the first and second forward speeds.

In the power train system and the vehicle including the same according to the present embodiment, the second transmission unit II according to the example of FIG. 2 outputs a driving power inputted through the bevel gear 9 of the bevel gear part as a forward or reverse driving power through the forward/reverse clutch part 121 and 126 and the idler part 131, and transfers the driving power to the axle output unit 200, as illustrated in FIGS. 1 to 9C. At this time, the second transmission unit II outputs the driving power at a constant speed without changing the rotation speed.

However, the second transmission unit II according to the example of FIG. 11 in the power train system and the vehicle including the same according to the present embodiment can not only output a rotational driving power inputted to the axle input unit 400 as a driving power corresponding to any one of the first and second reverse speeds through the reverse driving input part 421 and 426, but also output the rotational driving power as a driving power corresponding to any one of the first and second forward speeds through the forward driving input part 431 and 436.

More specifically, the reverse driving input part 421 and 426 may include a reverse input driving shaft 411 and a reverse multi-stage clutch pack. The reverse input driving shaft 411 is disposed at a side where the driving power of the bevel gear part is received, based on the axle shaft 220, and performs the same function as the input driving shaft 110, and the reverse multi-stage clutch pack is disposed on the reverse input driving shaft 411.

As described later, the reverse multi-stage clutch pack may include a pair of clutch packs which are selectively fixed to the reverse input driving shaft 411 depending on whether operation oil is supplied.

That is, the reverse multi-stage clutch pack includes a beveling gear 401, first and second reverse speed clutch parts 426 and 421 and a connection drive gear 425. The beveling gear 401 is formed on one side of the outer circumferential surface of the reverse input driving shaft 411 disposed perpendicular to the rotating shaft of the bevel gear part, the first and second reverse speed clutch parts 426 and 421 are disposed on the outer circumference of the reverse input driving shaft 411, and selectively switches a driving power into a first-reverse-speed driving power and second-reverse-speed driving power depending on whether oil is supplied, and the connection drive gear 425 is rotated with the reverse input driving shaft 411, and disposed between the first and second reverse speed clutch parts 426 and 421.

The reverse multi-stage clutch pack may further include a first reverse speed drive gear 429 and a second reverse speed drive gear 424. The first reverse speed drive gear 429 is rotated in connection with the first reverse speed clutch part 426, and engaged with a first speed differential transfer gear 217 of the differential gear part 210 so as to transfer the first-reverse-speed driving power, and the second reverse speed drive gear 424 is rotated in connection with the second reverse speed clutch part 421, and engaged with a second speed differential transfer gear 216 of the differential gear part 210 so as to transfer the second-reverse-speed driving power. The differential gear part 210 will be described later.

The forward driving input part 431 and 436 may include a forward input driving shaft 412 installed in parallel to both of the axle shaft 220 and the reverse input driving shaft 411 and a forward multi-stage clutch pack disposed on the forward input driving shaft 412.

At the time, as illustrated in FIG. 11, the axle shaft 220, the reverse input driving shaft 411 and the forward input driving shaft 412 may be disposed in parallel to each other.

As described later, the forward multi-stage clutch pack may include a pair of clutch packs which are selectively fixed to the forward input driving shaft 412 depending on whether operation oil is supplied.

That is, the forward multi-stage clutch pack includes first and second forward speed clutch parts 436 and 431 and a connection driven gear 435. The first and second forward speed clutch parts 436 and 431 are disposed on the outer circumference of the forward input driving shaft 412 disposed in parallel to the reverse input driving shaft 411, and selectively switch a driving power into a first-forward-speed driving power and second-forward-speed driving power depending on whether operation oil is supplied. The connection driven gear 435 is disposed between the first and second forward speed clutch parts 436 and 431.

The forward multi-stage clutch pack may further include a first forward speed drive gear 439 and a second forward speed drive gear 434. The first forward speed drive gear 439 is rotated in connection with the first forward speed clutch part 436, and engaged with the first speed differential transfer gear 217 of the differential gear part 210 so as to transfer the first-forward-speed driving power, and the second forward speed drive gear 434 is rotated in connection with the second forward speed clutch part 431, and engaged with the second speed differential transfer gear 216 of the differential gear part 210 so as to transfer the second-forward-speed driving power.

In the power train system and the vehicle including the same according to the present embodiment, the second transmission unit II according to the example of FIG. 11 may further include an idler part 131 having an idle gear (not illustrated) which is disposed to surround the axle shaft 220 or desirably the differential gear part 210, has one side engaged with the connection drive gear 425 of the reverse multi-stage clutch pack and the other side engaged with the connection driven gear 435 of the forward multi-stage clutch pack, and rotates the reverse input driving shaft 411 and the forward input driving shaft 412 at the same time.

The second transmission unit II may further include the first and second speed differential transfer gears 217 and 216 formed on the outer circumferential surfaces of the left and right differential gear cases 211 and 212, respectively. The first speed differential transfer gear 217 is engaged with the first reverse speed drive gear 429 or the first forward speed drive gear 439, and the second speed differential transfer gear 216 is engaged with the second reverse speed drive gear 424 or the second forward speed drive gear 434.

The driving power inputted from the bevel gear 9 of the bevel gear part is outputted to fix any one of the forward multi-stage clutch pack and the reverse multi-stage clutch pack, is speed-changed while being transferred to the differential gear part 210, and finally transferred to the wheel driving units III connected to the left and right wheels LW and RW through the left and right axle shafts 221 and 222.

FIGS. 12A to 12D are configuration diagrams illustrating power transfer processes by the second transmission unit II according to the example of FIG. 11 during the first forward speed mode, the second forward speed mode, the first reverse speed mode and the second reverse speed mode in the power train system and the vehicle including the same according to the present embodiment.

The speed change processes by the second transmission unit II according to the example of FIG. 11 during the neutral mode, the first forward speed mode, the second forward speed mode, the first reverse speed mode and the second reverse speed mode in the power train system and the vehicle including the same according to the present embodiment will be described in detail as follows.

First, the neutral mode will be described.

During the neutral mode as illustrated in FIG. 11, operation oil is not supplied to both of the forward clutch part 431 and 436 and the reverse clutch part 421 and 426. Therefore, when a rotational power is inputted to the reverse input driving shaft 411 through the bevel gear 9 of the bevel gear part, the reverse input driving shaft 411 is rotated, and the connection drive gear 425 is simultaneously rotated with the reverse input driving shaft 411. At this time, the forward input driving shaft 412 is also rotated by the idle gear of the idler part 131 which is engaged with the connection drive gear 425 and the connection driven gear 435 at the same time. In this case, however, since operation oil is not supplied to both of the forward clutch part 431 and 436 and the reverse clutch part 421 and 426, none of the forward clutch part 431 and 436 and the reverse clutch part 421 and 426 are operated, and none of the first forward speed drive gear 439 of the first forward speed clutch part 436 of the forward clutch part 431 and 436, the second forward speed drive gear 434 of the second forward speed clutch part 431 of the forward clutch part 431 and 436, the first reverse speed drive gear 429 of the first reverse speed clutch part 426 of the reverse clutch part 421 and 426, and the second reverse speed drive gear 424 of the second reverse speed clutch part 421 of the reverse clutch part 421 and 426 are rotated. Thus, the neutral mode is maintained while power transfer is not performed.

Hereafter, the second transmission unit II which is configured to change the torque and RPM of a driving power through multiple stages using the axle output unit 200 will be described. For example, the case in which the second transmission unit II is operated in the first or second forward or reverse speed mode will be described.

The second transmission unit II selectively readjusts a preset torque and RPM of a driving power transferred from the torque converter 3. The readjustment may indicate that the second transmission unit II primarily adjusts the torque and RPM of power generated by the power generator 1, that is, rotational power through the torque converter 3, and then secondarily adjusts the adjusted rotational power through the axle input unit and the axle output unit. In this case, the readjustment may include changing the rotation direction of the rotational power. For example, the second transmission unit II can change the rotation direction to the forward or reverse direction in order to switch the driving mode to the forward or reverse driving mode.

The readjustment may be performed by the axle input unit 100 and the axle output unit 200. The axle input unit 100 may decide the rotation direction for setting the forward or reverse driving mode as described above, and the axle output unit 200 may transfer the driving power received from the axle input unit 100 to the left and right wheels through two specific speeds, thereby readjusting the rotation information, that is, the torque and RPM of the driving power.

The specific speeds may indicate the number of speeds capable of changing a gear ratio. In an embodiment which will be described with reference to FIG. 12, the second transmission unit II may include two speeds, and change the velocity and torque by selectively driving power to the two speeds through application or cut-off of power by the connected idler part 131.

That is, when the torque of a driving power generated by the power generator 1 is converted by the first transmission unit I, the torque-changed driving power may be transferred to the axle output unit 200 through the second transmission unit II. Then, the rotation direction and speed of the driving power may be changed through the axle input unit 400 of the second transmission unit II. At this time, while the driving power is selectively transferred to the reverse driving input part 421 and 426 and the forward driving input part 431 and 436 which are included in the axle input unit 400, the corresponding rotation direction can be decided.

Specifically, the driving power may be connected to one of the reverse driving input part 421 and 426 and the forward driving input part 431 and 436 through the idler part 131. In order to describe the present embodiment, the case in which the idler part 133 transfers the driving power to the axle output unit 200 in connection with the reverse driving input part 421 and 426 will be taken as an example for description.

Furthermore, the rotation direction may be changed while the driving power is selectively transferred to the first speed clutch part 426 and 436 and the second speed clutch part 421 and 431 which are included in the reverse driving input part 421 and 426 and the forward driving input part 431 and 436, respectively. When the driving power is transferred to the axle output unit 200 through the reverse driving input part 421 and 426, the driving power may be transferred through a connection between the idler part 131 and one of the reverse driving input part 421 and 426 and the forward driving input part 431 and 436.

More specifically, four cases will be described from the first forward speed mode.

Figure 12A:
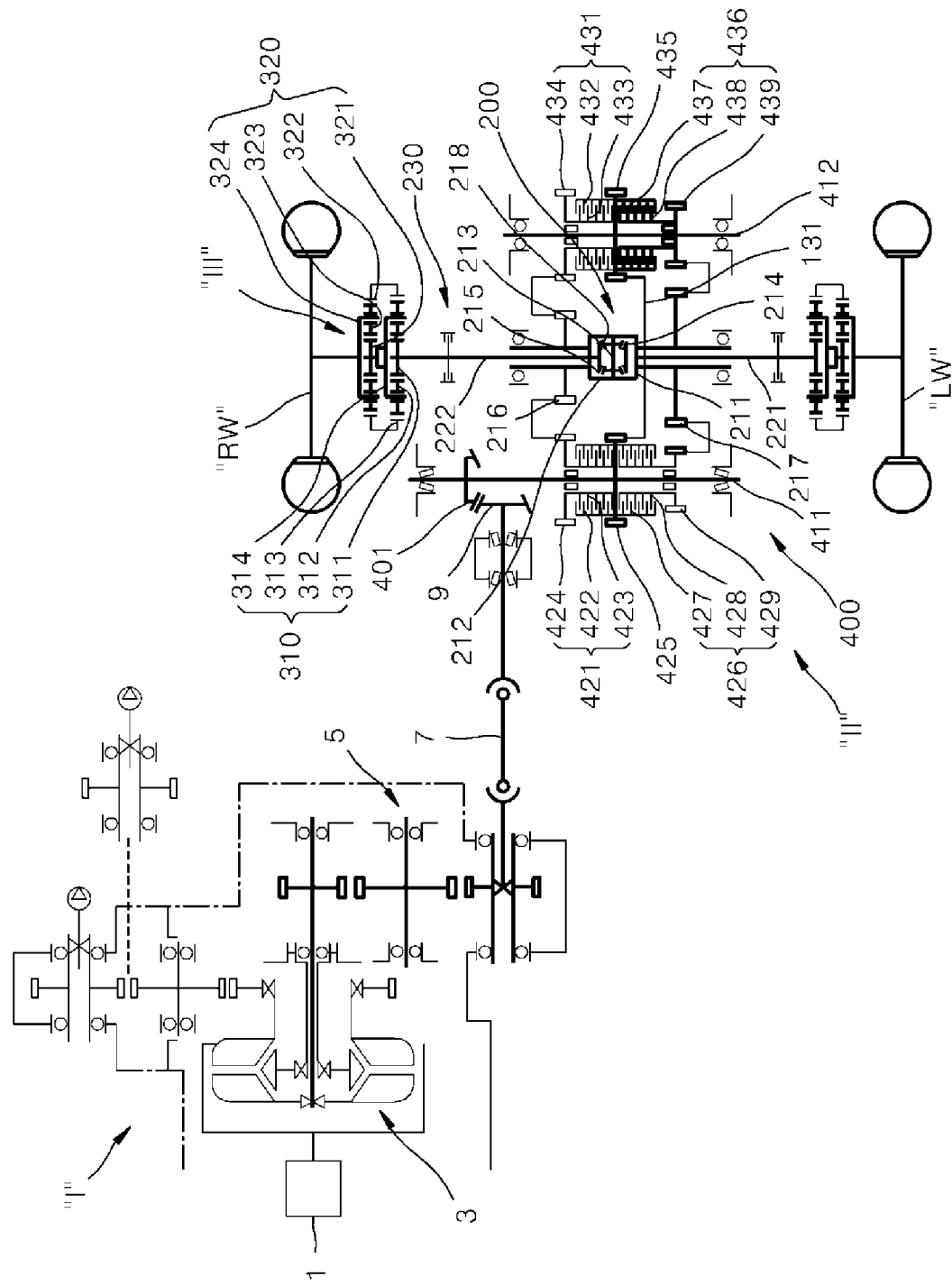
FIGS. 12A to 12D are configuration diagrams illustrating power transfer processes by the second transmission unit according to the example of FIG. 11 during a first forward speed mode, a second forward speed mode, a first reverse speed mode and a second reverse speed mode in the power train system according to the present embodiment.

Referring to FIG. 12A, the power transfer process in which the first forward speed is achieved by the forward clutch part 431 and 436 will be described as follows. When a rotational power is inputted to the reverse input driving shaft 411 through the bevel gear 9 of the bevel gear part, the reverse input driving shaft 411 is rotated, and the connection drive gear 425 is simultaneously rotated with the reverse input driving shaft 411. Simultaneously, the forward input driving shaft 412 is rotated by the idle gear of the idler part 131 which is engaged with the connection drive gear 425 and the connection driven gear 435 at the same time. At this time, when operation oil is supplied to the first forward speed clutch part 436 of the forward clutch part 431 and 436, the first forward speed drive gear 439 is rotated while the first forward speed clutch part 436 is fixed to the forward input driving shaft 412, the first speed differential transfer gear 217 engaged with the first forward speed drive gear 439 rotates the left differential gear case 211, and the left and right axle shafts 221 and 222 may be driven to the first forward speed by the rotation of the left differential gear case 211.

Next, the second forward speed mode will be described.

Figure 12B:
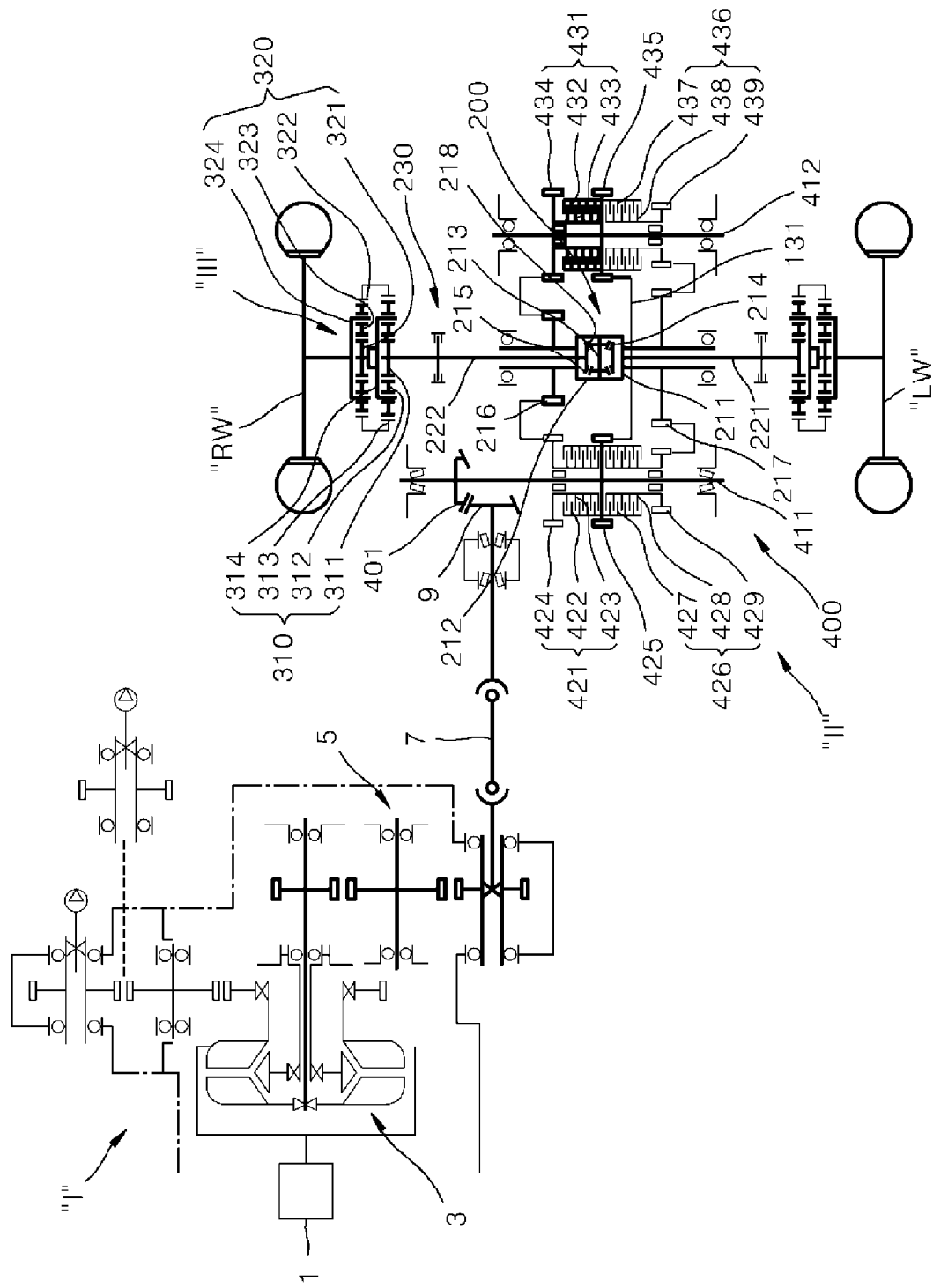

Referring to FIG. 12B, the second forward speed mode is performed in the same manner as the first forward speed mode until the forward input driving shaft 412 is rotated. Then, when operation oil is supplied to the second forward speed clutch part 431 of the forward clutch part 431 and 436, the second forward speed drive gear 434 is rotated while the second forward speed clutch part 431 is fixed to the forward input driving shaft 412, the second speed differential transfer gear 216 engaged with the second forward speed drive gear 434 rotates the right differential gear case 212, and the right and left axle shafts 222 and 221 may be driven to the second forward speed by the rotation of the right differential gear case 212.

Next, the first reverse speed mode will be described.

Figure 12C:
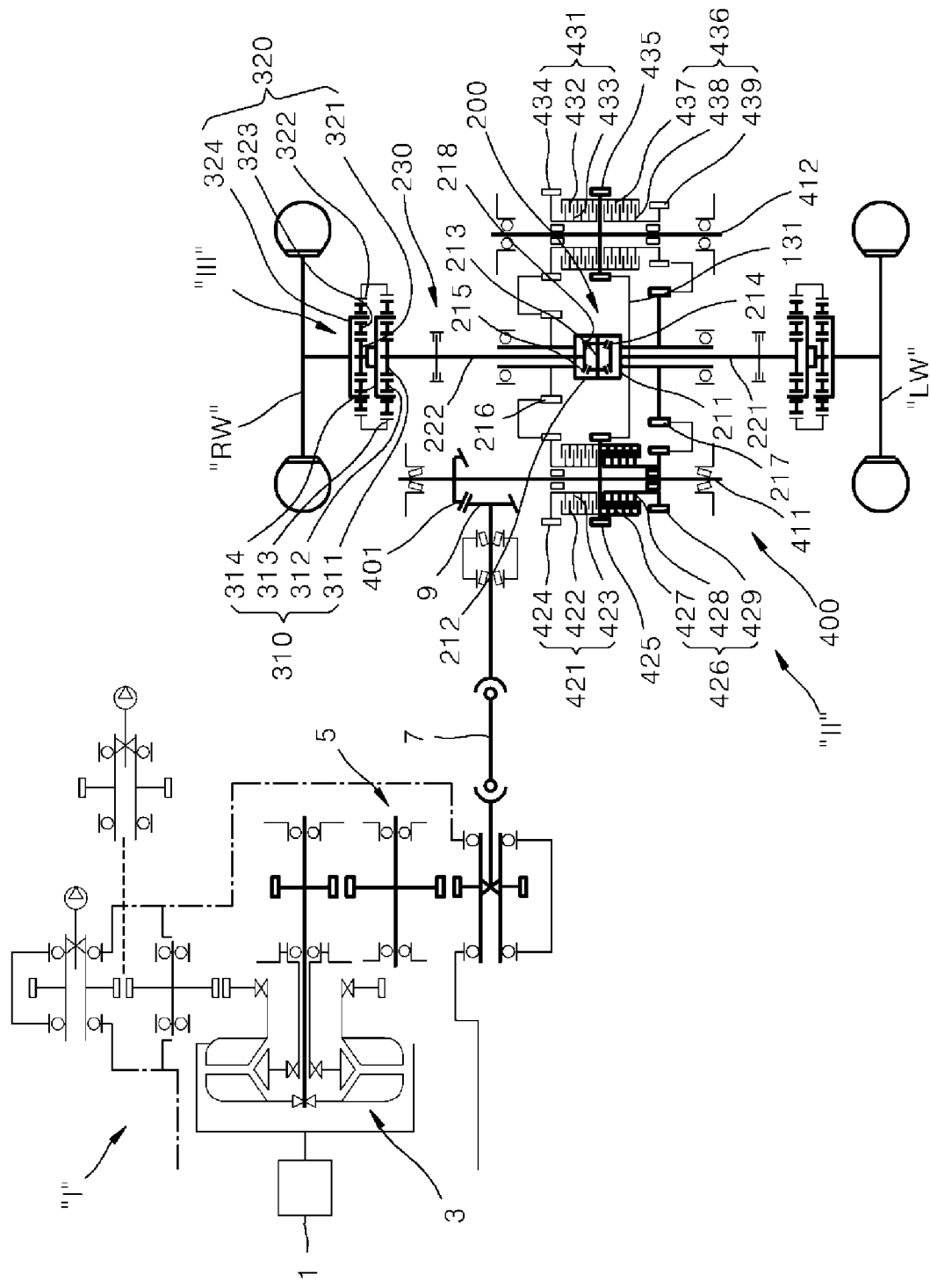

Referring to FIG. 12C, the power transfer process in which the first reverse speed is achieved by the reverse clutch part 421 and 426 will be described as follows. When a rotational power is inputted to the reverse input driving shaft 411 through the bevel gear 9 of the bevel gear part, the reverse input driving shaft 411 is rotated. At this time, when operation oil is supplied to the first reverse speed clutch part 426 of the reverse clutch part 421 and 426, the first reverse speed drive gear 429 is rotated while the first reverse speed clutch part 426 is fixed to the reverse input driving shaft 411, the first speed differential transfer gear 217 engaged with the first reverse speed drive gear 429 rotates the left differential gear case 211, and the left and right axle shafts 221 and 222 may be driven to the first reverse speed by the rotation of the left differential gear case 211. At this time, while the connection driven gear 435 engaged with the connection drive gear 425 of the reverse input driving shaft 411 is rotated, the connection driven gear 435 rotates the forward input driving shaft 412. However, since operation oil is not supplied to the forward clutch part 431 and 436, only the forward input driving shaft 412 is idled.

Next, the second reverse speed mode will be described.

Figure 12D:
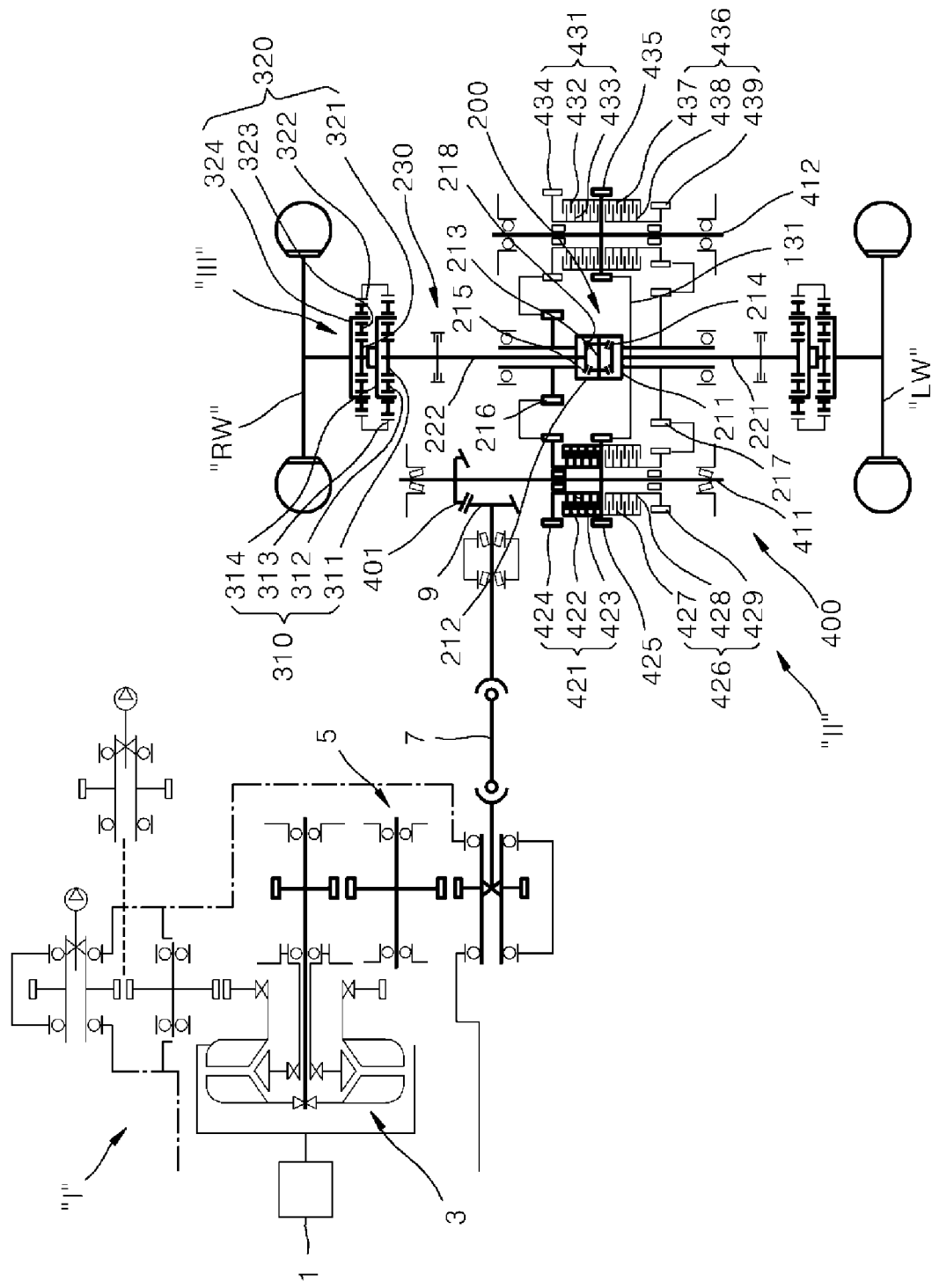

Referring to FIG. 12D, the second reverse speed mode is performed in the same manner as the first reverse speed mode until the reverse input driving shaft 411 is rotated. Then, when operation oil is supplied to the second reverse speed clutch part 421 of the reverse clutch part 421 and 426, the second reverse speed drive gear 424 is rotated while the second reverse speed clutch part 421 is fixed to the reverse input driving shaft 411, the second speed differential transfer gear 216 engaged with the second reverse speed drive gear 424 rotates the right differential gear case 212, and the right and left axle shafts 222 and 221 may be driven to the second reverse speed by the rotation of the right differential gear case 212.

In the power train system and the vehicle including the same according to the present embodiment, the second transmission unit II according to the example of FIG. 11 can be modified in a different manner as described later.

A control method of the power train system and the vehicle including the same according to another embodiment of the present disclosure will be described as follows.

The control method of the power train system and the vehicle including the same according to the present embodiment includes: a power output step in which the first transmission unit I receives power generated through the power generator 1 and outputs the received power through the bevel gear part forming the bevel gear rotating shaft in the longitudinal direction of the vehicle body; and a power change step in which the second transmission unit II changes the power inputted through the power output step to a specific speed and transfers the changed power to the wheel driving units III installed at the left and right wheels LW and RW.

The power change step includes: a shaft driving process of rotating the reverse input driving shaft 411 separated from the axle shaft 220 connected to the left and right wheels LW and RW and installed in parallel to the axle shaft 220 and the forward input driving shaft 412 disposed in parallel to the axle shaft 220 and the reverse input driving shaft 411; a clutch fixing process of fixing any one of the reverse clutch part and the forward clutch part (with no reference numerals) to the reverse input driving shaft 411 or the forward input driving shaft 412 by supplying operation oil to any one of the reverse clutch part and the forward clutch part which are installed on the reverse input driving shaft 411 and the forward input driving shaft 412, respectively, and each of which includes a pair of clutch parts; and a changed power output process of transferring the power changed by the reverse clutch parts or the forward clutch parts fixed through the clutch fixing process to the axle shaft 220. The reverse clutch part and the forward clutch part may correspond to the reverse driving input part 421 and 426 and the forward driving input part 431 and 436.

The shaft driving process may be defined as a process of rotating the reverse input driving shaft 411 and the forward input driving shaft 412 at the same time using the idler part 131 which is installed coaxially with the axle shaft 220 or separated from the axle shaft 220, disposed in parallel to the reverse input driving shaft 411 and the forward input driving shaft 412, and engaged with the reverse input driving shaft 411 and the forward input driving shaft 412 at the same time.

The clutch fixing process may include a first reverse speed process of fixing the first reverse speed clutch part 426 to the reverse input driving shaft 411 by supplying operation oil to the first reverse speed clutch part 426 having the first reverse speed drive gear 429 in the reverse clutch part, in relation to the first reverse speed.

The clutch fixing process may further include a second reverse speed process of fixing the second reverse speed clutch part 421 to the reverse input driving shaft 411 by supplying operation oil to the second reverse speed clutch part 421 having the second reverse speed drive gear 424 in the reverse clutch part, in relation to the second reverse speed.

The clutch fixing process may further include a first forward speed process of fixing the first forward speed clutch part 436 to the forward input driving shaft 412 by supplying operation oil to the first forward speed clutch part 436 having the first forward speed drive gear 439 in the forward clutch part, in relation to the first forward speed.

The clutch fixing process may further include a second forward speed process of fixing the second forward speed clutch part 431 to the forward input driving shaft 412 by supplying operation oil to the second forward speed clutch part 431 having the second forward speed drive gear 434 in the forward clutch part, in relation to the second forward speed.

The changed power output process may be defined as a process of engaging any one of the reverse clutch part and the forward clutch part with any one of the first and second transfer gears 217 and 216 of the differential gear part 210 installed between the left axle shaft 221 connected to the left wheel LW and the right axle shaft 222 connected to the right wheel RW.

The changed power output process may include a first reverse speed output process of fixing the first reverse speed clutch part 426 of the reverse clutch part to the reverse input driving shaft 411 such that the first reverse speed drive gear 429 installed in the first reverse speed clutch part 426 is engaged with any one of the first and second transfer gears 217 and 216 of the differential gear part 210, in relation to the first reverse speed.

The changed power output process may further include a second reverse speed output process of fixing the second reverse speed clutch part 421 of the reverse clutch part to the reverse input driving shaft 411 such that the second reverse speed drive gear 424 installed in the second reverse speed clutch part 421 is engaged with any one of the first and second transfer gears 217 and 216 of the differential gear part 210, in relation to the second reverse speed.

The changed power output process may further include a first forward speed output process of fixing the first forward speed clutch part 436 of the forward clutch part to the forward input driving shaft 412 such that the first forward speed drive gear 439 installed in the first forward speed clutch part 436 is engaged with any one of the first and second transfer gears 217 and 216 of the differential gear part 210, in relation to the first forward speed.

The changed power output process may further include a second forward speed output process of fixing the second forward speed clutch part 431 of the forward clutch part to the forward input driving shaft 412 such that the second forward speed drive gear 434 installed in the second forward speed clutch part 431 is engaged with any one of the first and second transfer gears 217 and 216 of the differential gear part 210, in relation to the second forward speed.

According to the embodiments of the present disclosure, the control method of the power train system can accomplish the following effects.

First, since the connection portion to the bevel gear of the bevel gear part is flexibly set in the radial direction based on the axle shaft, the degree of freedom in design can be improved.

Second, a part of the components for the speed change function in the axle shaft can be installed on a separate shaft, which makes it possible to reduce the size of the product.

Third, since a part of the components for the speed change function can be separated from the axle shaft having a complex structure for the speed change function to the outside, precise gears may not be needed. Thus, the manufacturing cost of the product can be reduced.

Fourth, the control method of the power train system can be easily applied to a heavy equipment vehicle, and achieve multiple speeds.

Although the representative embodiments of the present disclosure have been disclosed in detail, those having ordinary skill in the field of technology to which the present disclosure pertains would understand that various modifications are possible, without departing from the scope of the present disclosure. Accordingly, the scope of the present disclosure should not be construed as being limited to the described embodiments but be defined by the appended claims as well as equivalents thereof.

What is claimed is:

1. A control method of a power train system, comprising:
   a power output step in which a first transmission unit receives a power generated from a power generator, and outputs the received power through a bevel gear part forming a bevel gear rotating shaft in a longitudinal direction of a vehicle body; and
   a power change step in which a second transmission unit changes the power output from the power output step to a specific speed, and transfers the changed power to wheel driving units installed at left and right wheels,
   wherein the power change step comprises:
   a shaft driving process of rotating a reverse input driving shaft separated from an axle shaft connected to the left and right wheels and installed in parallel to the axle shaft and a forward input driving shaft installed in parallel to the reverse input driving shaft;
   a clutch fixing process of fixing any one of reverse and forward clutch parts to the reverse or forward input driving shaft by supplying operation oil to the corresponding clutch part, wherein the reverse and forward clutch parts are installed on the reverse and forward input driving shafts, respectively, and each of the reverse and forward clutch parts includes a pair of clutch parts; and
   a changed power output process of transferring the changed power to the axle shaft through the reverse or forward clutch part fixed through the clutch fixing process,
   wherein the shaft driving process comprises a process of rotating the reverse and forward input driving shafts at the same time, using an idler part which is installed coaxially with the axle shaft or separated from the axle shaft, installed in parallel to the reverse and forward input driving shafts, and engaged with the reverse and forward input driving shafts at the same time.

2. The control method of claim 1, wherein the clutch fixing process comprises a first reverse speed process of fixing a first reverse speed clutch part to the reverse input driving shaft by supplying operation oil to the first reverse speed clutch part having a first reverse speed drive gear in the reverse clutch part.

3. The control method of claim 2, wherein the clutch fixing process comprises a second reverse speed process of fixing a second reverse speed clutch part to the reverse input driving shaft by supplying operation oil to the second reverse speed clutch part having a second reverse speed drive gear in the reverse clutch part.

4. The control method of claim 1, wherein the clutch fixing process comprises a first forward speed process of fixing a first forward speed clutch part to the forward input driving shaft by supplying operation oil to the first forward speed clutch part having a first forward speed gear in the forward clutch part.

5. The control method of claim 4, wherein the clutch fixing process comprises a second forward speed process of fixing a second forward speed clutch part to the forward input driving shaft by supplying operation oil to the second forward speed clutch part having a second forward speed gear in the forward clutch part.

6. The control method of claim 1, wherein the changed power output process comprises a process of engaging any one of the reverse and forward clutch parts with any one of first and second transfer gears of a differential gear part installed between a left axle shaft connected to the left wheel of the wheels and a right axle shaft connected to the right wheel of the wheels.

7. The control method of claim 6, wherein the changed power output process comprises a first reverse speed output process of fixing a first reverse speed clutch part of the reverse clutch part to the reverse input driving shaft such that a first reverse speed drive gear installed in the first reverse speed clutch part is engaged with any one of first and second transfer gears of the differential gear part.

8. The control method of claim 7, wherein the changed power output process comprises a second reverse speed output process of fixing a second reverse speed clutch part of the reverse clutch part to the reverse input driving shaft such that a second reverse speed drive gear installed in the second reverse speed clutch part is engaged with any one of first and second transfer gears of the differential gear part.

9. The control method of claim 6, wherein the changed power output process comprises a first forward speed output process of fixing a first forward speed clutch part of the forward clutch part to the forward input driving shaft such that a first forward speed drive gear installed in the first forward speed clutch part is engaged with any one of first and second transfer gears of the differential gear part.

10. The control method of claim 9, wherein the changed power output process comprises a second forward speed output process of fixing a second forward speed clutch part of the forward clutch part to the forward input driving shaft such that a second forward speed drive gear installed in the second forward speed clutch part is engaged with any one of first and second transfer gears of the differential gear part.

11. A control method of a power train system, comprising:
a power output step in which a first transmission unit receives a power generated from a power generator, and outputs the received power through a bevel gear part forming a bevel gear rotating shaft in a longitudinal direction of a vehicle body; and
a power change step in which a second transmission unit changes the power output from the power output step to a specific speed, and transfers the changed power to wheel driving units installed at left and right wheels,
wherein the second transmission unit comprises a reverse input driving shaft separate from an axle shaft connected to the left and right wheels and installed in parallel to the axle shaft and a forward input driving shaft installed in parallel to the reverse input driving shaft
wherein the power change step comprises:
a shaft driving process of rotating, by an idler shaft separate from the axle shaft, the reverse input driving shaft or the forward input driving shaft;
a clutch fixing process of fixing any one of reverse and forward clutch parts to the reverse or forward input driving shaft by supplying operation oil to the corresponding clutch part, wherein the reverse and forward clutch parts are installed on the reverse and forward input driving shafts, respectively, and each of the reverse and forward clutch parts includes a pair of clutch parts; and
a changed power output process of transferring the changed power to the axle shaft through the reverse or forward clutch part fixed through the clutch fixing process.

12. The control method of claim 11, wherein the clutch fixing process comprises a first reverse speed process of fixing a first reverse speed clutch part to the reverse input driving shaft by supplying operation oil to the first reverse speed clutch part having a first reverse speed drive gear in the reverse clutch part.

13. The control method of claim 11, wherein the clutch fixing process comprises a second reverse speed process of fixing a second reverse speed clutch part to the reverse input driving shaft by supplying operation oil to the second reverse speed clutch part having a second reverse speed drive gear in the reverse clutch part.

14. The control method of claim 11, wherein the clutch fixing process comprises a first forward speed process of fixing a first forward speed clutch part to the forward input driving shaft by supplying operation oil to the first forward speed clutch part having a first forward speed gear in the forward clutch part.

15. The control method of claim 11, wherein the clutch fixing process comprises a second forward speed process of fixing a second forward speed clutch part to the forward input driving shaft by supplying operation oil to the second forward speed clutch part having a second forward speed gear in the forward clutch part.

16. A power train system, comprising:
an axle shaft connected to left and right wheels;
first transmission unit which is configured to receive a power generated from a power generator, and output the received power through a bevel gear part forming a bevel gear rotating shaft in a longitudinal direction of a vehicle body; and
a second transmission unit which is configured to change the power inputted from the first transmission unit to a specific speed, and transfer the changed power to wheel driving units installed at the left and right wheels,
wherein the second transmission unit comprises:
a reverse input driving shaft separate from an axle shaft connected to the left and right wheels and installed in parallel to the axle shaft;
a forward input driving shaft installed in parallel to the reverse input driving shaft;
an idler shaft, separate from the axle shaft and installed in parallel to the axle shaft, to rotate the reverse input driving shaft or the forward input driving shaft; and
a clutch actuator which is configured to fix any one of reverse and forward clutch parts to the reverse or forward input driving shaft by supplying operation oil to the corresponding clutch part, wherein the reverse and forward clutch parts are installed on the reverse and forward input driving shafts, respectively, and each of the reverse and forward clutch parts includes a pair of clutch parts.

17. The power train system of claim 16, wherein the clutch actuator is further configured to fix a first reverse speed clutch part to the reverse input driving shaft by supplying operation oil to the first reverse speed clutch part having a first reverse speed drive gear in the reverse clutch part.

18. The power train system of claim 17, wherein the clutch actuator is further configured to fix a second reverse speed clutch part to the reverse input driving shaft by supplying operation oil to the second reverse speed clutch part having a second reverse speed drive gear in the reverse clutch part.

19. The power train system of claim 16, wherein the clutch actuator is further configured to fix a first forward speed clutch part to the forward input driving shaft by supplying operation oil to the first forward speed clutch part having a first forward speed gear in the forward clutch part.

20. The power train system of claim 19, wherein the clutch actuator is further configured to fix a second forward speed clutch part to the forward input driving shaft by supplying operation oil to the second forward speed clutch part having a second forward speed gear in the forward clutch part.

* * * * *